United States Patent
Takado et al.

(10) Patent No.: US 9,900,532 B2
(45) Date of Patent: Feb. 20, 2018

(54) IMAGING APPARATUS, IMAGING SYSTEM, AND IMAGE PROCESSING METHOD

(71) Applicant: CANON KABUSHIKI KAISHA, Tokyo (JP)

(72) Inventors: Hisashi Takado, Kawasaki (JP); Noriyuki Kaifu, Atsugi (JP); Fujio Kawano, Kawasaki (JP); Tomoya Onishi, Ayase (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 100 days.

(21) Appl. No.: 15/143,817

(22) Filed: May 2, 2016

(65) Prior Publication Data
US 2016/0344956 A1 Nov. 24, 2016

(30) Foreign Application Priority Data

May 19, 2015 (JP) .................. 2015-101706

(51) Int. Cl.
| | | |
|---|---|---|
| *H04N 5/359* | (2011.01) | |
| *H04N 9/04* | (2006.01) | |
| *H04N 5/232* | (2006.01) | |
| *H04N 5/378* | (2011.01) | |

(52) U.S. Cl.
CPC ....... *H04N 5/3597* (2013.01); *H04N 5/23229* (2013.01); *H04N 5/378* (2013.01); *H04N 9/045* (2013.01)

(58) Field of Classification Search
CPC .. H04N 5/23229; H04N 5/3597; H04N 5/378; H04N 9/045
See application file for complete search history.

(56) References Cited

U.S. PATENT DOCUMENTS

| | | |
|---|---|---|
| 4,922,117 A | 5/1990 | Saika et al. |
| 6,271,880 B1 | 8/2001 | Kameshima et al. |
| 6,717,151 B2 | 4/2004 | Tashiro et al. |
| 6,798,453 B1 | 9/2004 | Kaifu |
| 6,800,836 B2 | 10/2004 | Hamamoto et al. |

(Continued)

FOREIGN PATENT DOCUMENTS

| | | |
|---|---|---|
| JP | 4598162 | 12/2010 |
| WO | 2010/090025 | 8/2010 |

OTHER PUBLICATIONS

U.S Appl. No. 14/926,125, Hisashi Takado, filed Oct. 29, 2015.
U.S Appl. No. 14/956,798, Kazuyuki Shigeta, filed Dec. 2, 2015.
U.S Appl. No. 15/143,724, Hisashi Takado, filed May 2, 2016.

*Primary Examiner* — Amy Hsu
(74) *Attorney, Agent, or Firm* — Fitzpatrick, Cella, Harper & Scinto

(57) ABSTRACT

To increase image quality of a moving image by suppressing a color afterimage while reducing color noise, provided is an imaging apparatus, including: an imaging device; and a signal processing unit, in which: the imaging device includes a first pixel group and a second pixel group each including a plurality of pixels each configured to output a pixel signal; and the signal processing unit is configured to perform weighted addition for a second pixel signal output from the second pixel group by inter-frame processing, and to change a weight on each frame in the weighted addition based on an inter-frame differential of a first pixel signal.

20 Claims, 19 Drawing Sheets

(56) References Cited

U.S. PATENT DOCUMENTS

| | | | |
|---|---|---|---|
| 8,243,160 B2* | 8/2012 | Azuma | H04N 5/145 |
| | | | 348/154 |
| 9,142,575 B2 | 9/2015 | Kobayashi et al. | |
| 2009/0244328 A1* | 10/2009 | Yamashita | H04N 5/357 |
| | | | 348/241 |
| 2010/0013963 A1* | 1/2010 | Jannard | H04N 5/3675 |
| | | | 348/242 |
| 2010/0271515 A1* | 10/2010 | Imagawa | H04N 5/144 |
| | | | 348/266 |
| 2011/0181752 A1* | 7/2011 | Nakashima | H04N 9/045 |
| | | | 348/223.1 |
| 2011/0298965 A1* | 12/2011 | Price | H04N 5/2351 |
| | | | 348/362 |
| 2012/0081577 A1* | 4/2012 | Cote | H04N 19/80 |
| | | | 348/231.99 |
| 2014/0253752 A1 | 9/2014 | Kawano et al. | |
| 2015/0319384 A1 | 11/2015 | Onishi | |
| 2016/0037059 A1* | 2/2016 | Lim | G06T 5/002 |
| | | | 348/241 |
| 2016/0037060 A1* | 2/2016 | Lim | H04N 5/23229 |
| | | | 348/241 |
| 2016/0050381 A1 | 2/2016 | Onishi et al. | |
| 2016/0112663 A1 | 4/2016 | Takado | |

* cited by examiner

FIG. 4A
BAYER(RGB)

| R | G | R | G | R | G | R | G |
|---|---|---|---|---|---|---|---|
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |

FIG. 4B
RGBW12

| R | W | G | W | R | W | G | W |
|---|---|---|---|---|---|---|---|
| W | W | W | W | W | W | W | W |
| G | W | B | W | G | W | B | W |
| W | W | W | W | W | W | W | W |
| R | W | G | W | R | W | G | W |
| W | W | W | W | W | W | W | W |
| G | W | B | W | G | W | B | W |
| W | W | W | W | W | W | W | W |

FIG. 4C
RGBW8

| W | R | W | G | W | R | W | G |
|---|---|---|---|---|---|---|---|
| B | W | G | W | B | W | G | W |
| W | G | W | R | W | G | W | R |
| G | W | B | W | G | W | B | W |
| W | R | W | G | W | R | W | G |
| B | W | G | W | B | W | G | W |
| W | G | W | R | W | G | W | R |
| G | W | B | W | G | W | B | W |

FIG. 4D
RGBG12

| R | G | B | G | R | G | B | G |
|---|---|---|---|---|---|---|---|
| G | G | G | G | G | G | G | G |
| B | G | R | G | B | G | R | G |
| G | G | G | G | G | G | G | G |
| R | G | B | G | R | G | B | G |
| G | G | G | G | G | G | G | G |
| B | G | R | G | B | G | R | G |
| G | G | G | G | G | G | G | G |

FIG. 5A
BAYER(CMY)

| M | Y | M | Y | M | Y | M | Y |
|---|---|---|---|---|---|---|---|
| Y | C | Y | C | Y | C | Y | C |
| M | Y | M | Y | M | Y | M | Y |
| Y | C | Y | C | Y | C | Y | C |
| M | Y | M | Y | M | Y | M | Y |
| Y | C | Y | C | Y | C | Y | C |
| M | Y | M | Y | M | Y | M | Y |
| Y | C | Y | C | Y | C | Y | C |

FIG. 5B
CMYW12

| M | W | Y | W | M | W | Y | W |
|---|---|---|---|---|---|---|---|
| W | W | W | W | W | W | W | W |
| Y | W | C | W | Y | W | C | W |
| W | W | W | W | W | W | W | W |
| M | W | Y | W | M | W | Y | W |
| W | W | W | W | W | W | W | W |
| Y | W | C | W | Y | W | C | W |
| W | W | W | W | W | W | W | W |

FIG. 5C
CMYW8

| W | M | W | Y | W | M | W | Y |
|---|---|---|---|---|---|---|---|
| C | W | Y | W | C | W | Y | W |
| W | Y | W | M | W | Y | W | M |
| Y | W | C | W | Y | W | C | W |
| W | M | W | Y | W | M | W | Y |
| C | W | Y | W | C | W | Y | W |
| W | Y | W | M | W | Y | W | M |
| Y | W | C | W | Y | W | C | W |

FIG. 5D
CMYY12

| M | Y | C | Y | M | Y | C | Y |
|---|---|---|---|---|---|---|---|
| Y | Y | Y | Y | Y | Y | Y | Y |
| C | Y | M | Y | C | Y | M | Y |
| Y | Y | Y | Y | Y | Y | Y | Y |
| M | Y | C | Y | M | Y | C | Y |
| Y | Y | Y | Y | Y | Y | Y | Y |
| C | Y | M | Y | C | Y | M | Y |
| Y | Y | Y | Y | Y | Y | Y | Y |

|  | X=1 | X=2 | X=3 | X=4 | X=5 | X=6 | X=7 | X=8 |
|---|---|---|---|---|---|---|---|---|
| Y=1 | ? | W | ? | W | ? | W | ? | W |
| Y=2 | W | W | W | W | W | W | W | W |
| Y=3 | ? | W | ? | W | ? | W | ? | W |
| Y=4 | W | W | W | W | W | W | W | W |
| Y=5 | ? | W | ? | W | ? | W | ? | W |
| Y=6 | W | W | W | W | W | W | W | W |
| Y=7 | ? | W | ? | W | ? | W | ? | W |
| Y=8 | W | W | W | W | W | W | W | W |

|  | X=1 | X=2 | X=3 | X=4 | X=5 | X=6 | X=7 | X=8 |
|---|---|---|---|---|---|---|---|---|
| Y=1 | ? | W | ? | W | ? | W | ? | W |
| Y=2 | W | W | W | W | W | W | W | W |
| Y=3 | ? | W | ? | W | ? | W | ? | W |
| Y=4 | W | W | W | W | W | W | W | W |
| Y=5 | ? | W | ? | W | ? | W | ? | W |
| Y=6 | W | W | W | W | W | W | W | W |
| Y=7 | ? | W | ? | W | ? | W | ? | W |
| Y=8 | W | W | W | W | W | W | W | W |

FIG. 10

| CONDITION | LUMINANCE | NUMBER OF RGB PROCESSED FRAMES (n) | DISCRIMINATION PROCESSING WITH W | NOISE | AFTERIMAGE |
|---|---|---|---|---|---|
| No1 | 0.1lx | 1 | NONE | C | A |
| No2 | 0.1lx | 4 | NONE | B | A |
| No3 | 0.05lx | 4 | NONE | C | A |
| No4 | 0.05lx | 8 | NONE | A | C |
| No5 | 0.05lx | 8 | DONE | A | A |

N-1 FRAME

N FRAME

IMAGING APPARATUS, IMAGING SYSTEM, AND IMAGE PROCESSING METHOD

BACKGROUND OF THE INVENTION

Field of the Invention

The present invention relates to an imaging apparatus, an imaging system, and an image processing method.

Description of the Related Art

In a solid-state imaging apparatus of a single-plate type, in order to obtain a color image, color filters (CFs) each configured to transmit light of a specific wavelength component, for example, light of a color of red (R), green (G), or blue (B), are arrayed in a predetermined pattern. As a pattern of CFs, a pattern having a so-called Bayer array is often used. In the following, a pixel in which the CF of R is arranged is referred to as "R pixel", a pixel in which the CF of G is arranged is referred to as "G pixel", a pixel in which the CF of B is arranged referred to as "B pixel", and a pixel in which no CF is arranged is referred to as "W pixel (white pixel or clear pixel)". In addition, the R pixel, the G pixel, and the B pixel are sometimes referred to collectively as "RGB pixels" or "color pixels".

In order to improve the sensitivity of the solid-state imaging apparatus, there is proposed a configuration for increasing the proportion of pixels from which information on a luminance is obtained easily. Above all, the W pixel that widely transmits light within a visible light range enables to improve the sensitivity and to obtain an image having a high S/N ratio. International Publication No. WO2010/090025A describes an imaging apparatus configured such that a ratio of the numbers of RGB pixels and W pixels is R:G:B:W=1:1:1:1. This imaging apparatus restores an RGB image for each frame time based on motion information, which has been detected from an image of W pixels, and images of RGB and an image of W pixels, which have been subjected to addition for each frame.

The apparatus described in the international publication No. WO2010/090025A is directed to reduce color noise by increasing the number of frames of RGB pixels to be subjected to the addition. However, there is a problem in that a color afterimage is caused by an object exhibiting a large motion.

SUMMARY OF THE INVENTION

According to one embodiment of the present invention, there is provided an imaging apparatus, including: an imaging device; and a signal processing uni in which: the imaging device includes a first pixel group and a second pixel group each including a plurality of pixels each configured to output a pixel signal; the pixel signal output by the plurality of pixels of the second pixel group includes a smaller amount of resolution information than an amount of resolution information included in the pixel signal output by the plurality of pixels of the first pixel group; and the signal processing unit is configured to perform weighted addition for a second pixel signal output from the second pixel group by inter-frame processing, and to change a weight on each frame in the weighted addition based on an inter-frame differential of a first pixel signal.

According to another embodiment of the present invention, there is provided an image processing method for processing a pixel signal output from an imaging apparatus, the imaging apparatus including: an imaging device; and a signal processing unit, the imaging device including a first pixel group and a second pixel group each including a plurality of pixels each configured to output the pixel signal, the pixel signal output by the plurality of pixels of the second pixel group including a smaller amount of resolution information than an amount of resolution information included in the pixel signal output by the plurality of pixels of the first pixel group, the image processing method including performing weighted addition for a second pixel signal output from the second pixel group by inter-frame processing, and changing a weight on each frame in the weighted addition based on an inter-frame differential of a first pixel signal.

Further features of the present invention will become apparent from the following description of exemplary embodiments with reference to the attached drawings.

BRIEF DESCRIPTION OF THE DRAWINGS

FIG. 4A, FIG. 4B, FIG. 4C and FIG. 4D are diagrams for illustrating examples of a color filter array using RGB.

FIG. 5A, FIG. 5B, FIG. 5C and FIG. 5D are diagrams for illustrating examples of a color filter array using complementary colors.

FIG. 10 is a table for showing evaluation results of the imaging apparatus according to the first embodiment.

DESCRIPTION OF THE EMBODIMENTS

An imaging apparatus according to each embodiment of the present invention is described with reference to the accompanying drawings. In the following description, like components are denoted by like reference symbols.

First Embodiment

Figure 1:
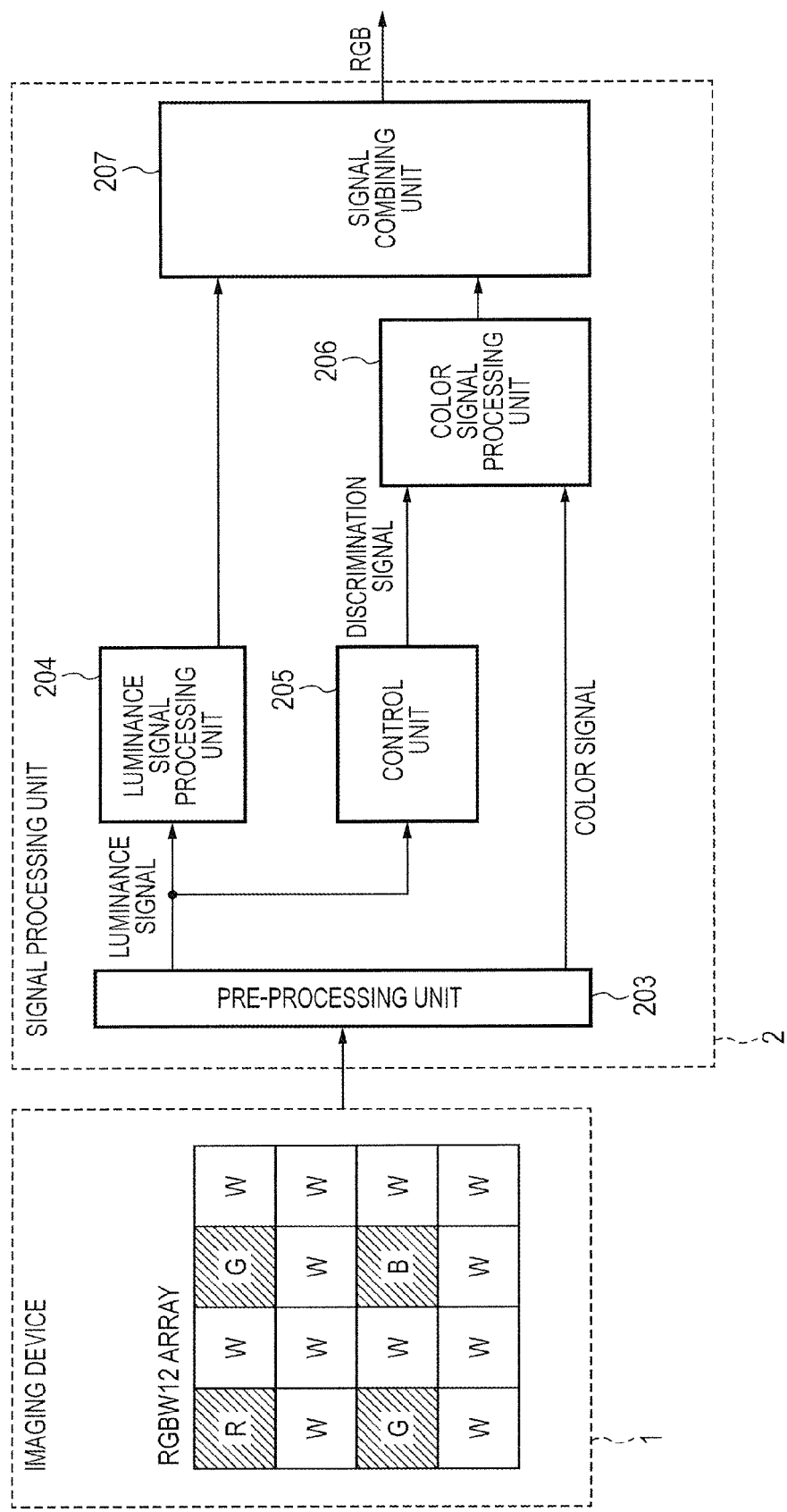
FIG. 1 is a block diagram of an imaging apparatus according to a first embodiment of the present invention.

FIG. 1 is a block diagram of an imaging apparatus according to a first embodiment of the present invention. The imaging apparatus includes an imaging device 1 and a signal processing unit 2. The imaging device 1 is a so-called single-plate color sensor in which color filters are arranged on a CMOS image sensor or on a CCD image sensor. When a color image is formed with a single-plate color sensor, interpolation needs to be conducted as described later. For example, an R pixel has no information (pixel value) of G or B. Therefore, based on pixel values of G and B around the R pixel, pixel values of G and B in the R pixel are generated by interpolation processing. The imaging device 1 includes a plurality of pixels arranged in a matrix shape, for example, includes 2,073,600 pixels in total of 1,920 pixels in a column direction and 1,080 pixels in a row direction. The number of pixels of the imaging device 1 is not limited thereto, and may be a larger number of pixels or a smaller number of pixels. In addition, the imaging apparatus may not necessarily include the imaging device 1, and it suffices that the imaging apparatus include the signal processing unit 2 configured to process a pixel signal (RAW data) received from the imaging device 1.

CFs according to this embodiment use an RGBW12 array illustrated in FIG. 1. In the RGBW12 array, a 4×4 pixel array is repeated, and a ratio of the numbers of pixels among the respective colors is R:G:B:W=1:2:1:12. In the RGBW12 array, the pixels of R, G, and B being color pixels are each surrounded by eight W pixels, and the proportion of the W pixels accounts for ¾ of all the pixels. In other words, the RGBW12 array includes W pixels as a first pixel group, and includes color pixels (RGB pixels) as a second pixel group. A total sum of the number of pixels of the first pixel group is three or more times larger (more than two times or larger) than a total sum of the number of pixels of the second pixel group, and the second pixel group has a smaller amount of resolution information than that of the first pixel group. The imaging device 1 can include not only effective pixels but also pixels that do not output an image, such as an optical black pixel and a dummy pixel that does not include a photoelectric converter. However, the optical black pixel or the dummy pixel is not included in the first pixel group or the second pixel group. The W pixel has a wider spectral sensitivity characteristic and a higher sensitivity than those of the RGB pixel. For example, a wavelength half width of the spectral sensitivity characteristic of the W pixel is larger than that of the RGB pixel.

In the RGBW12 array, the W pixels are arranged around each of the RGB pixels, and hence a W pixel value in the position of the RGB pixel can be interpolated with high accuracy. The W pixels account for ¾ of all the pixels, and thus the sensitivity can be improved. This embodiment is particularly effective for an imaging device in which the pixels for obtaining resolution information account for a half or more of all the pixels.

The signal processing unit 2 includes a pre-processing unit 203, a luminance signal processing unit 204, a control unit 205, a color signal processing unit 206, and a signal combining unit 207. A pixel signal received from the imaging device 1 is input to the pre-processing unit 203. The pre-processing unit 203 executes various kinds of correction including offset correction and gain correction for the pixel signal. When the pixel signal output from the imaging device 1 is an analog signal, A/D conversion may be executed by the pre-processing unit 203.

The pre-processing unit 203 appropriately carries out correction such as offset (OFFSET) correction and gain (GAIN) correction for an input pixel signal Din to generate a corrected output Dout. This processing is expressed typically by the following expression.

$$D\text{out} = (D\text{in} - \text{OFFSET}) \cdot \text{GAIN}$$

This correction can be conducted in units of various circuits. For example, the correction may be conducted for each pixel. In addition, the correction may be conducted for each of circuits of a column amplifier, an analog-to-digital conversion unit (ADC), and an output amplifier. Through the correction, so-called fixed pattern noise is reduced, and an image with higher quality can be obtained. The pre-processing unit 203 separates an image signal of W for resolution information (luminance signal) and a pixel signal of RGB for color information (color signal) to output the luminance signal to the luminance signal processing unit 204 and output the color signal to the color signal processing unit 206.

The luminance signal processing unit 204 can interpolate the signal received from the pre-processing unit 203 with high accuracy. That is, in the RGBW12 array, there are a large number of W pixels for obtaining resolution information, and hence it is possible to obtain information having a higher spatial frequency, namely, a finer pitch, than the CF array having a checkered pattern. Therefore, a pixel value of a part in which an RGB pixel exists, that is, a part in which no W pixel exists, is obtained from an average of pixel values of surrounding eight W pixels, to thereby be able to obtain an image having a sufficiently high resolution. In another case, an edge may be detected based on edge information and information such as a cyclic shape to interpolate the W pixel in the position of the RGB pixel. In this case, it is possible to obtain an image having a higher resolution than in the case of using the average of the surrounding eight pixels. In the following, the W pixel generated by interpolation is represented as iW.

The color signal processing unit 206 conducts inter-frame processing for the pixel signal of RGB being a color signal, to thereby reduce color noise such as false colors. The inter-frame processing is conducted by subjecting a plurality of frames different in time to weighted addition. The color signal processing unit 206 generates color information to be used for combining the luminance signal and the color signal. The control unit 205 determines a change (correlation) of the luminance signal between frames, and changes the number of frames (weight) to be used for the inter-frame processing conducted by the color signal processing unit 206 based on a determination result. With this operation, it is possible to suppress the color noise such as a color after-image caused by an object exhibiting a large motion.

Figure 2:
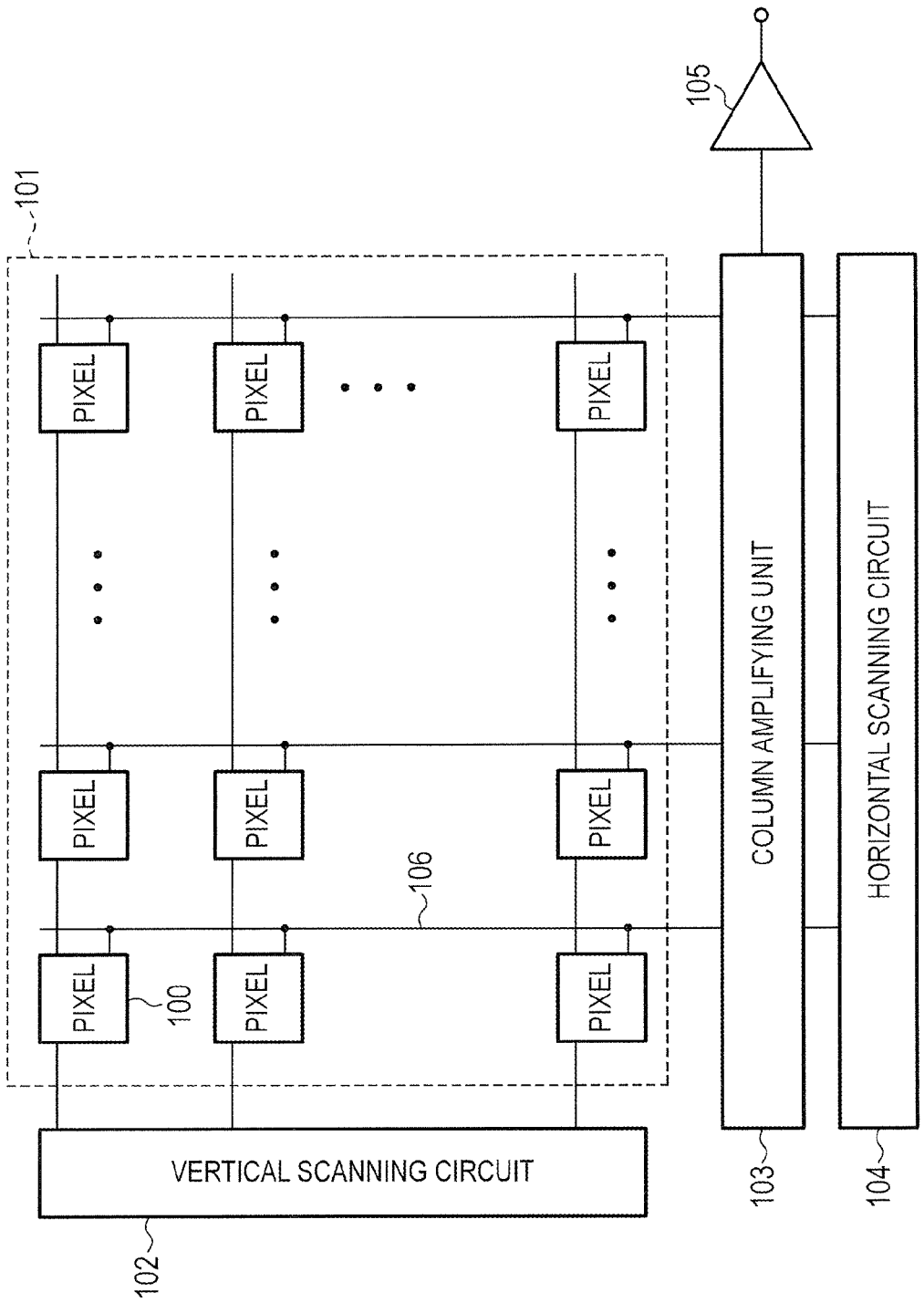
FIG. 2 is a block diagram of an imaging device according to the first embodiment.

FIG. 2 is a block diagram of the imaging device 1 according to this embodiment. The imaging device includes an imaging area 101, a vertical scanning circuit 102, a column amplifying unit 103, a horizontal scanning circuit 104, and an output unit 105. As described above, the imaging area 101 has pixels 100 arranged in a matrix shape, and includes the first pixel group for a luminance signal and the second pixel group for a color signal. The vertical scanning circuit 102 supplies a control signal for controlling a transistor of the pixel 100 between an on state (conducting state) and an off state (non-conducting state). A vertical signal line 106 is provided to each column of the pixels 100, and reads signals from the pixels 100 column by column. The horizontal scanning circuit 104 includes a switch connected to an amplifier of each column, and supplies a control signal for controlling the switch between an on state and an off state. The output unit 105 is formed of a buffer amplifier, a differential amplifier, or the like, and outputs the pixel signal received from the column amplifying unit 103 to the signal processing unit 2 outside the imaging device 1. The output pixel signal is subjected to processing such as analog-to-digital conversion and correction of the input data by the signal processing unit 2.

The imaging device 1 may also be a so-called digital sensor having an analog-to-digital conversion function. The pixel 100 includes CFs for controlling a spectral sensitivity characteristic, and in this embodiment, CFs of RGBW12 are arranged.

Figure 3:
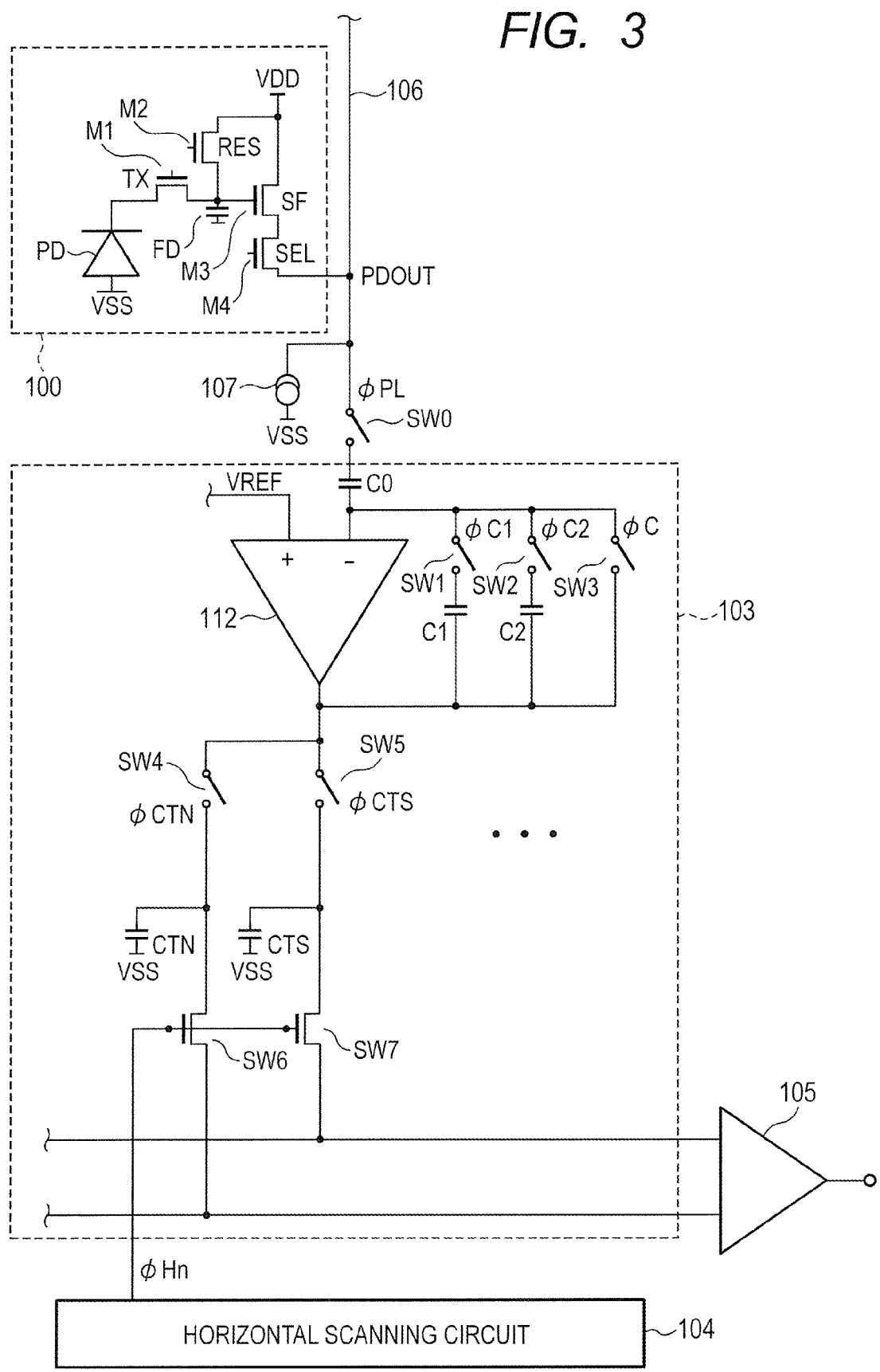
FIG. 3 is a circuit diagram of the imaging device and a column amplifying unit according to the first embodiment.

FIG. 3 is a circuit diagram of the pixel 100 and the column amplifying unit 103 of the imaging device 1 according to this embodiment. In this case, in order to facilitate description, a circuit corresponding to one column within the column amplifying unit 103 and one pixel 100 are illustrated. The pixel 100 includes a photodiode PD, a stray diffusion capacitance FD, a transfer transistor M1, a reset transistor M2, an amplifying transistor M3, and a selection transistor M4. The pixel 100 may also be configured so that a plurality of photodiodes PD share the stray diffusion capacitance FD, the reset transistor M2, the amplifying transistor M3, and the selection transistor M4. The transistors M2 to M4 are not limited to an N-channel MOS, and may also be formed of a P-channel MOS.

The photodiode PD is configured to photoelectrically convert applied light into an electron (charge). A signal TX is supplied to a gate of the transfer transistor M1, and when the signal TX is set to a high level, the transfer transistor M1 transfers the charge generated in the photodiode PD to the stray diffusion capacitance FD. The stray diffusion capacitance FD serves as a drain terminal of the transfer transistor M1, and can hold the charge transferred from the photodiode PD via the transfer transistor M1. A signal RES is supplied to a gate of the reset transistor M2, and when the signal RES is set to a high level, the reset transistor M2 resets the voltage of the stray diffusion capacitance FD to a reset voltage VDD. When the transfer transistor M1 and the reset transistor M2 are simultaneously turned on, the electron of the photodiode PD is reset. A gate of the amplifying transistor M3 is connected to the stray diffusion capacitance FD.

A source of the amplifying transistor M3 is electrically connected to a node PDOUT of the vertical signal line 106 common to each column via the selection transistor M4 to form a source follower. A signal SEL is applied to a gate of the selection transistor M4, and when the signal SEL is set to a high level, the vertical signal line 106 and the amplifying transistor M3 are electrically connected to each other. With this arrangement, a pixel signal is read from the selected pixel 100.

The signal TX, the signal RES, and the signal SEL to be supplied to the pixel 100 are output from the vertical scanning circuit 102. The vertical scanning circuit 102 controls signal levels of those signals, to thereby scan the pixels 100 in units of rows. A current source 107 supplies a current to the pixel 100 via the vertical signal line 106, and the vertical signal line 106 is connected to the column amplifying unit 103 via a switch SW0 driven by the signal PL.

The column amplifying unit 103 includes a column amplifier 112, an input capacitance C0, feedback capacitances C1 and C2, switches SW1 to SW7, and capacitances CTN and CTS. The column amplifier 112 is formed of a differential amplifier circuit including an inverted input node, a non-inverted input node, and an output node. The inverted input node of the column amplifier 112 is electrically connected to the vertical signal line 106 via the switch SW0 and the input capacitance C0, and a reference voltage VREF is applied to the non-inverted input node. The inverted input node and the output node are connected to each other via three feedback circuits that are connected in parallel. A first feedback circuit is formed of the switch SW1 and the feedback capacitance C1 that are connected in series, a second feedback circuit is formed of the switch SW2 and the feedback capacitance C2 that are connected in series, and a third feedback circuit is formed of the switch SW3. An amplification factor of the column amplifier 112 can be changed by appropriately controlling the on state and the off state of the switches SW1 to SW3. That is, when only the switch SW1 is turned on, the amplification factor becomes C0/C1, and when only the switch SW2 is turned on, the amplification factor becomes C0/C2. Further, when the switches SW1 and SW2 are turned on, the amplification factor becomes C0/(C1+C2), and when only the switch SW3 is turned on, the column amplifier 112 operates as a voltage follower. The switches SW1 to SW3 are controlled by signals φC1, φC2, and φC, respectively.

The output node of the column amplifier 112 is connected to the capacitance CTN via the switch SW4 controlled by a signal φCTN. In the same manner, the output node of the column amplifier 112 is connected to the capacitance CTS via the switch SW5 controlled by a signal φCTS. When the stray diffusion capacitance FD is reset, the switch SW4 is turned on, the switch SW5 is turned off, and a pixel signal (N signal) at a time of the resetting is sampled and held the capacitance CTN. After the photoelectrically-converted charge is transferred to the stray diffusion capacitance FD, the switch SW4 is turned off, the switch SW5 is turned on, and a pixel signal (S signal) based on the photoelectrically-converted charge is sampled and held by the capacitance CTS.

The capacitance CTN is connected to a first input node of the output unit 105 via the switch SW6, and the capacitance CTS is connected to a second input node of the output unit 105 via the switch SW7. The horizontal scanning circuit 104 sets a signal φHn of each column to a high level in order, to thereby conduct horizontal scanning. That is, when the signal φHn is set to a high level, the switch SW6 outputs the N signal held by the capacitance CTN to the first input node of the output unit 105, and the switch SW7 outputs the S signal held by the capacitance CTS to the second input node of the output unit 105.

The output unit 105 is formed of a differential amplifier circuit, and amplifies and outputs a differential between the input S signal and N signal, to thereby output a pixel signal from which a noise component at the time of the resetting has been removed. The output unit 105 may be configured to subject the N signal and the S signal to the analog-to-digital conversion and then to correlated double sampling.

As described above, an optical signal input to the imaging device 1 is read as an electric signal. Further, two-dimensional information of a spectral intensity corresponding to the CF array of RGBW12 is obtained. This embodiment is not limited to the CF array of RGBW12, and can be applied to various CF arrays. Examples of the CF array to which this embodiment can be applied are described below.

FIG. 4A to FIG. 4D are illustrations of examples of a CF array using RGB as color pixels. FIG. 4A is an illustration of CFs of a Bayer array, and a ratio of the numbers of CFs is R:G:B=1:2:1. In this case, a larger number of G pixels (first pixels) than the number of RB pixels (second pixels) are arranged because a human visual characteristic has a higher sensitivity to a wavelength of green than wavelengths of red and blue, and because a sense of resolution of an image depends on the wavelength of green more strongly than red and blue.

FIG. 4B is an illustration of the CF array of RGBW12. As described above, in this array, the respective CFs are arranged at the ratio of R:G:B:W=1:2:1:12 in the 4×4 pixel array. W pixels (first pixels) are arranged adjacent to each of RGB pixels (second pixels) being color pixels in a vertical direction, a horizontal direction, and an oblique direction in a plan view. That is, the RGB pixels are each surrounded by eight W pixels. The proportion of the W pixels accounts for ¾ of all the pixels. The RGB pixels being color pixels are each surrounded by the W pixels.

FIG. 4C is an illustration of a CF array of RGBW8. In the 4×4 pixel array, respective CFs are arrayed at the ratio of R:G:B:W=2:4:2:8. The W pixels (first pixels) are arranged in a checkered pattern, and an RGB pixel (second pixel) is arranged among the W pixels. The proportion of the W pixels is ½ of all the pixels. The W pixels are arranged in a checkered pattern in the same manner as the G pixels within the Bayer array, and hence a method of interpolating the G pixel of the Bayer array can be used as it is. The arrangement of the W pixels allows an improvement in the sensitivity.

FIG. 4D is an illustration of a CF array of RGBG12. In this array, the W pixels of RGBW12 are replaced by G pixels (first pixels), and in the 4×4 pixel array, CFs of the respective colors are arranged at the ratio of R:G:B=2:12:2. RB pixels (second pixels) are each surrounded by the G pixels, and the proportion of the G pixels accounts for ¾ of all the pixels. The RB pixels are each surrounded by the G pixels, and hence the accuracy improves in the interpolation of the G value of the color pixel. The proportion of the G pixels, which have a higher sensitivity than the RB pixels, is large, and hence the sensitivity can be improved.

FIG. 5A to FIG. 5D are illustrations of examples of a CF array using cyan (C), magenta (M), and yellow (Y) which are complementary colors, as color pixels. FIG. 5A is an illustration of the Bayer array, and the ratio of the CFs of the respective colors is C:M:Y=1:1:2. In this case, a large number of Y pixels (first pixels) are arranged because the Y pixel has a high sensitivity in the same manner as the G pixel.

FIG. 5B is an illustration of a CF array of CMYW12. In the 4×4 pixel array, the CFs of the respective colors are arrayed at the ratio of C:M:Y:W=1:1:2:12. CMY pixels (second pixels) being color pixels are each surrounded by W pixels (first pixels). The proportion of the W pixels accounts for ¾ of all the pixels. The CMY pixels are each surrounded by the W pixels, and hence the accuracy can be improved in the interpolation of a W pixel value in the position of the CMY pixel. The arrangement of the W pixels allows an improvement in the sensitivity.

FIG. 5C is an illustration of a CF array of CMYW8. In the 4×4 pixel array, the CFs of the respective colors are arrayed at the ratio of C:M:Y:W=2:2:4:8. The W pixels (first pixels) are arranged in a checkered pattern, and the CMY pixels (second pixels) are each surrounded by the W pixels. The proportion of the W pixels is ½ of all the pixels. The W pixels are arranged in a checkered pattern in the same manner as the G pixels within the Bayer array, and hence a method of interpolating the G pixel of the Bayer array can be used as it is. The arrangement of the W pixels allows an improvement in the sensitivity.

FIG. 5D is an illustration of a CF array of CMYY12. The W pixels of CMYW12 are replaced by Y pixels (first pixels), and in the 4×4 pixel array, the respective CFs are arranged at the ratio of C:M:Y=2:2:12. The C pixel and the M pixel (second pixels) are each surrounded by the Y pixels, and the proportion of the arranged Y pixels accounts for ¾ of all the pixels. The C pixel and the M pixel are each surrounded by the Y pixels, and hence the accuracy can be improved in the interpolation of the pixel value of Y in the position of each of the C pixel and the M pixel. The proportion of the Y pixels, which have a relatively higher sensitivity than the C pixel and the M pixel, is large, and hence the sensitivity improves.

As described above, various CF arrays can be employed in this embodiment, but in order to generate an image having a high resolution, it is preferred to arrange a larger number of pixels (first pixels) that contribute to the resolution to a larger extent. It is desired that the first pixel group include a larger amount of resolution information than that of the second pixel group, and that the second pixel group include at least two kinds of pixels different in spectral sensitivity. It is desired that the first pixel group have a higher degree of contribution to the luminance than the second pixel group.

In the Bayer array, the G pixels that contribute to the resolution are arranged in a checkered pattern, which is liable to cause an interpolation error. The inventors of the present invention found that the interpolation error can be minimized through use of a CF array that yields a higher resolution than the checkered pattern. Therefore, the effects of the present invention are particularly noticeable through use of the CF arrays exemplified in RGBW12 of FIG. 4B, RGBG12 of FIG. 4D, CMYW12 of FIG. 5B, and CMYY12 of FIG. 5D.

Figure 6:
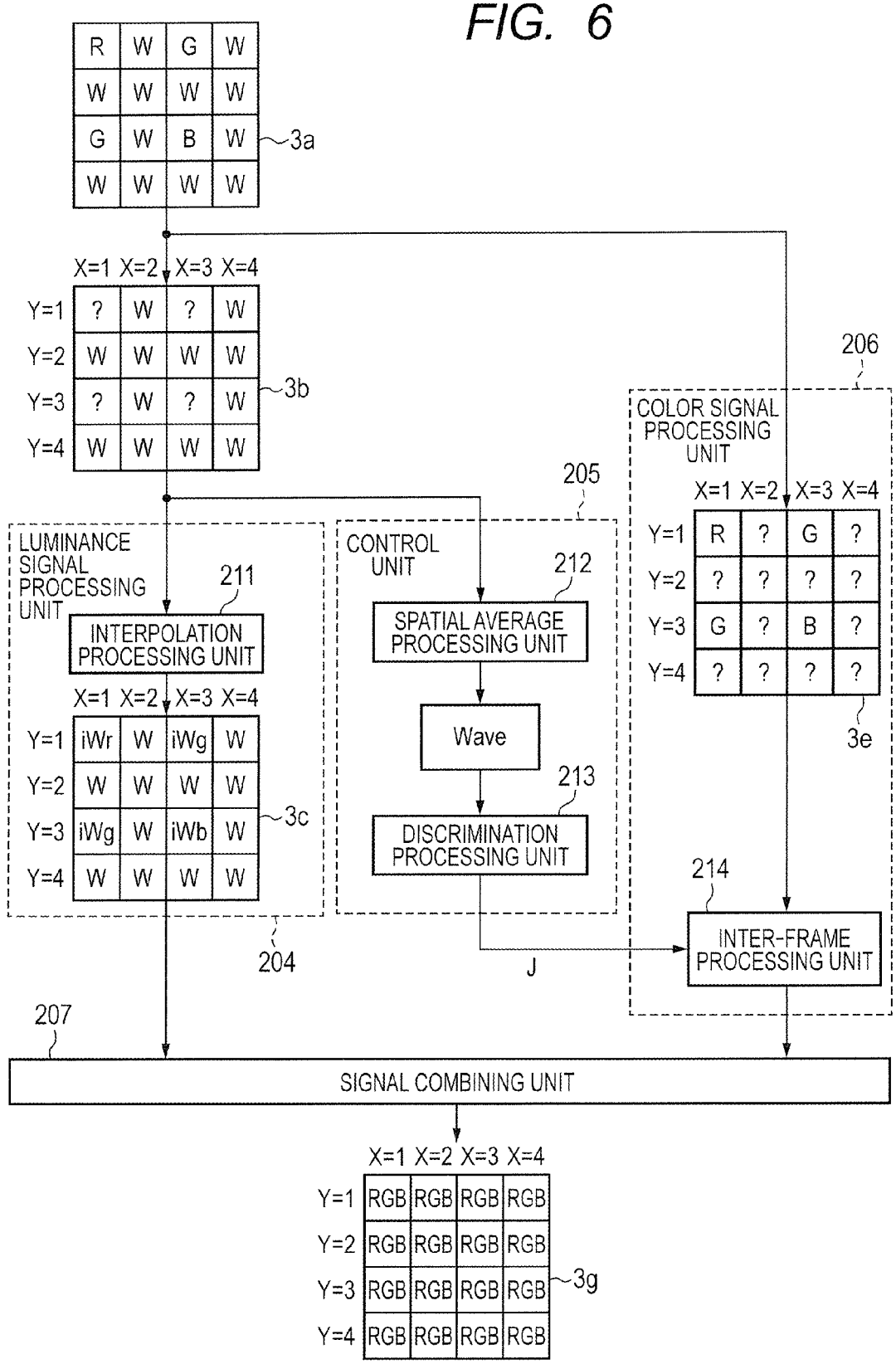
FIG. 6 is a block diagram of a signal processing unit of the imaging apparatus according to the first embodiment.

FIG. 6 is a block diagram of the signal processing unit 2 of the imaging apparatus according to this embodiment. The signal processing unit 2 includes the luminance signal processing unit 204, the control unit 205, the color signal processing unit 206, and the signal combining unit 207, and is configured to conduct demosaicing processing for a pixel signal 3a received from the imaging device 1 to generate an image signal 3g including information of RGB for each pixel. The signal processing unit 2 can be configured by hardware such as an image processing processor, but the same configuration can be implemented through use of a general-purpose processor or software on a computer.

The pixel signal 3b, which includes a CF array of RGBW12 and is expressed by digital data, is input to the luminance signal processing unit 204. In FIG. 6, 4×4 pixels serving as one unit of repetition of the CF array are illustrated, but in the actual pixel signal 3a, the array of the 4×4 pixels is repeated. The input pixel signal 3a is separated into a pixel signal 3b of W and a pixel signal 3e of RGB by the pre-processing unit 203 (not shown).

The luminance signal processing unit 204 includes an interpolation processing unit 211, and the interpolation processing unit 211 is configured to generate a pixel value of a part in which a pixel value of W does not exist within the pixel signal 3b of W by interpolation. There is no pixel value of W existing in positions from which RGB pixels has been separated within the pixel signal 3b of W, and in FIG. 6, those positions are each represented by "?". The interpolation processing unit 211 interpolates the pixel value in the position of "?" based on the surrounding pixel values of W to generate pixel values of iWr, iWg, and iWb by interpolation. For example, there is no W pixel existing at coordinates (3,3) within the pixel signal 3b, and hence the pixel value of iWb (3,3) at the coordinates (3,3) is obtained from an average value of the surrounding eight W pixel values as expressed by the following expression.

$$iWb_{(3,3)} = \frac{W_{(2,2)} + W_{(3,2)} + W_{(4,2)} + W_{(2,3)} + W_{(4,3)} + W_{(2,4)} + W_{(3,4)} + W_{(4,4)}}{8}$$

In FIG. 6, the 4×4 pixel array is illustrated, but in actuality, the pixel array is repeated, and each of an R pixel at coordinates (1,1), a G pixel at coordinates (3,1), and a G pixel at coordinates (1,3) is surrounded by eight W pixels. Therefore, the pixel values of iWr and iWg can also be generated by interpolation through use of the surrounding eight pixel values of W in the same manner.

Examples of an interpolation processing method that can be appropriately used include not only the above-mentioned method but also a bilinear method and a bicubic method.

The control unit 205 includes a spatial average processing unit 212 and a discrimination processing unit 213. The spatial average processing unit 212 is configured to calculate an average value $W_{ave}$ of pixels for each predetermined block within the pixel signal 3b of W. The discrimination processing unit 213 is configured to compare an inter-frame differential of the average value $W_{ave}$ with a threshold value, and to output a discrimination signal J based on a comparison result. The color signal processing unit 206 includes an inter-frame processing unit 214, and the inter-frame processing unit 214 is configured to conduct inter-frame processing for the pixel signal 3e of RGB to reduce the color noise or false colors. The signal combining unit 207 is configured to calculate the color ratio information of the respective RGB pixels subjected to the inter-frame processing and the W pixels, and to generate an image signal 3g expressed by pixel values of RGB based on the color ratio information.

Figures 7A, 7B, 7C:
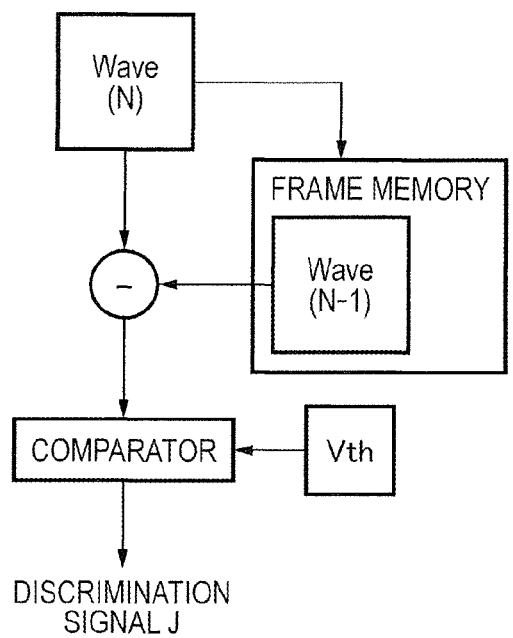
FIG. 7A, FIG. 7B and FIG. 7C are diagrams for illustrating processing of a control unit according to the first embodiment.

FIG. 7A and FIG. 7B are illustrations of examples of the pixel area to be used for spatial average processing conducted by the control unit 205. One block of the RGBW12 pixel array is formed of 4×4 pixels, and hence the average value of the pixel values of W included in one block can be calculated. That is, in FIG. 7A, the average value $W_{ave}$ can be calculated for each block by arithmetically operating spatial average of the W values of 12 pixels at (x,y)=(2,1), (4,1), (1,2), (2,2), (3,2), (4,2), (2,3), (4,3), (1,4), (2,4), (3,4), and (4,4). The average value $W_{ave}$ calculated in this manner is used in discrimination of the inter-frame processing for the RGB pixels at (x,y), (1,1), (3,1), (1,3), and (3,3) included in the same block.

FIG. 7B is an illustration of another example of the pixel area for the spatial average processing. In the RGBW12 pixel array, each of the RGB pixels is surrounded by the W pixels. For example, the B pixel at (x,y)=(3,3) is surrounded by eight W pixels of (x,y)=(2,2), (3,2), (4,2), (2,3), (4,3), (2,4), (3,4), and (4,4). Therefore, the average value $W_{ave}$ of the eight W pixels may be used for the discrimination of the inter-frame processing for the B pixel at (3,3). In the same manner, the average value $W_{ave}$ of the eight W pixels around the G pixel at (5,3) can be used for the discrimination of the inter-frame processing for the G pixel at (5,3). In any one of the examples of FIG. 7A and FIG. 7B, a plurality of pixel values of W around the RGB pixels to be subjected to the inter-frame processing are used to calculate the average value $W_{ave}$ for each pixel area. The spatial average processing may be conducted through use of not only a simple average but also a weighted average, a smoothing filter, or the like.

FIG. 7C is an illustration of details of processing conducted by the discrimination processing unit 213. An average value $W_{ave}$ (N) of the W pixels in the N-th frame and an average value $W_{ave}$ (N−1) of the W pixels in the (N−1)th frame are stored in frame memory. The discrimination processing unit 213 compares an absolute value of a differential between the average value (N) and the average value $W_{ave}$ (N−1) with a predefined threshold value Vth, and outputs the discrimination signal (signal value) J based on the comparison result for each pixel area. When the absolute value of the differential is larger than the threshold value Vth, the discrimination signal J is "1", and when the absolute value of the difference is equal to or smaller than the threshold value Vth, the discrimination signal J is "0" (Mathematical Expression 3). The discrimination signal J indicates whether or not there has been a change in the luminance within the pixel area included in the average value $W_{ave}$, that is, a temporal change of the object.

$$|W_{ave}(N) - W_{ave}(N-1)| > Vth \rightarrow J=1$$

$$|W_{ave}(N) - W_{ave}(N-1)| \leq Vth \rightarrow J=0$$

When an object moves, it is a rare case that there is a change only in colors, and the luminance usually changes. For this reason, a temporal change of the object can be detected with higher accuracy by detecting the differential of the W pixel value exhibiting a high sensitivity instead of detecting the differential of the RGB pixel value. In the RGBW12 array according to this embodiment, the number of W pixels is larger than the number of RGB pixels. Therefore, through use of the spatial average value of the W pixel, it is possible to further reduce the noise of the W pixel, to thereby be able to avoid the influence of the noise in the discrimination conducted between frames.

Figure 8A:
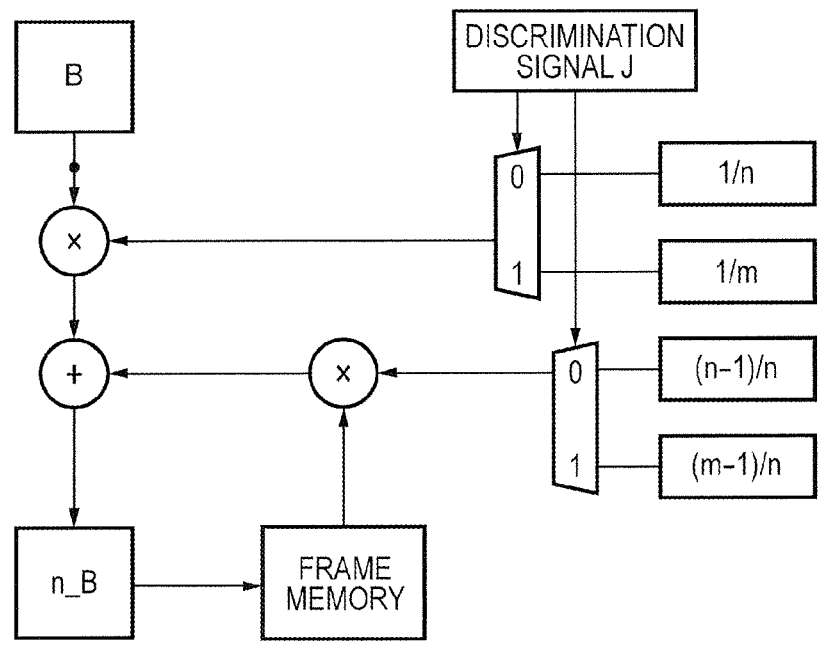
FIG. 8A and FIG. 8B are diagrams for illustrating inter-frame processing conducted by a color signal processing unit according to the first embodiment.
Figure 8B:
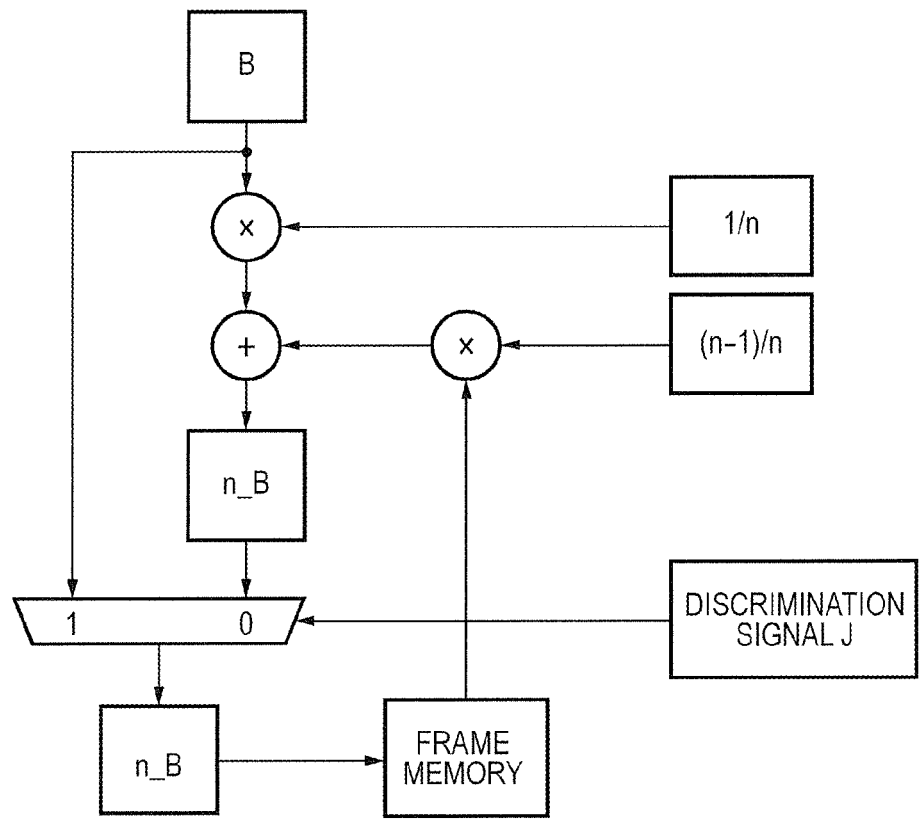

FIG. 8A and FIG. 8B are illustrations of the inter-frame processing conducted by the inter-frame processing unit 214. In this case, the inter-frame processing for the B pixel is illustrated, but the same processing is also conducted for the pixels of R and G. The inter-frame processing unit 214 uses an IIR filter (recursive filter) to conduct weighted addition for each of the pixel value in the current frame and the pixel value in another frame different in time. In the inter-frame processing of FIG. 8A, the weighted addition is conducted through use of any one of factors m and n (n>m) based on the discrimination signal J.

When the discrimination signal J is "0", that is, when the temporal change in the luminance within the pixel area to be subjected to the inter-frame processing is small, the inter-frame processing unit 214 adds a value obtained by multiplying the pixel value accumulated in the frame memory by the factor (n−1)/n and a value obtained by multiplying the current pixel value of B by the factor 1/n to obtain an inter-frame processed pixel value of n_B. When the discrimination signal J is "1", that is, when the temporal change in the luminance within the pixel area is large, the inter-frame processing unit 214 adds a value obtained by multiplying the pixel value accumulated in the frame memory by the factor (m−1)/m and a value obtained by multiplying the current pixel value of B by the factor 1/m to obtain the inter-frame processed pixel value of n_B. The inter-frame processed pixel value of n_B is accumulated in the frame memory, and is subjected to the weighted addition in the next inter-frame processing. That is, the pixel value in the past frame is fed back to the pixel value in the next frame, and the addition averaging is conducted. In this case, it is assumed that n>m, and hence in a pixel area exhibiting a large temporal change in the luminance, the weight on the past frame is relatively smaller than the weight on the current frame. Meanwhile, in a pixel area exhibiting a small temporal change in the luminance, the weight on the past frame is relatively larger than the weight on the current frame. Note that, in the following description, "changing the weight" refers to increasing or reducing the weight on a frame, or also refers to reducing the weight to zero. The reducing the weight on the past frame or reducing the weight to zero may also be referred to as "reducing the number of processed frames".

As another example of the inter-frame processing, processing illustrated in FIG. 8B may be employed. When the discrimination signal J is "0", the inter-frame processing unit 214 adds the value obtained by multiplying the pixel value accumulated in the frame memory by the factor (n−1)/n and the value obtained by multiplying the pixel value of B in the current frame by the factor 1/n to obtain the inter-frame processed pixel value of n_B. When the discrimination signal J is "1", the inter-frame processing unit 214 outputs the pixel value of B in the current frame as it is, and further stores the pixel value of B in the current frame into the frame memory. This processing is the same processing conducted in the case where m=1 in FIG. 8A. In this manner, in the pixel area exhibiting a large temporal change in the luminance, the weight on the current frame is increased in the inter-frame processing, to thereby be able to reduce color blur and an afterimage that are caused by the addition of the pixel value in the past frame.

In the above description, the discrimination signal J is a one-bit signal representing "0" and "1", but may be a signal having two bits or more. That is, a magnitude (differential) of the motion of an object may be expressed by the discrimination signal J having a plurality of bits, and the weight on a color signal for the inter-frame processing or the number of frames for the inter-frame processing may be changed (increased or reduced) based on the magnitude of the discrimination signal J. In this case, the prevention of a colored afterimage and the reduction in color noise can be maintained at an optimum balance depending on the object.

The signal combining unit 207 generates the image signal 3g including RGB information for each pixel based on the luminance signal subjected to the interpolation processing and the color signal or pixel signal subjected to the inter-frame processing. The processing of the signal combining unit 207 is described below in detail. In FIG. 6, the signal combining unit 207 arithmetically operates the color ratio (color information) in each pixel based on a pixel signal 3c subjected to the interpolation and the inter-frame processed pixel values of n_R, n_G, and n_B. On the assumption that the color ratio is constant within the 4×4 pixel area, the color information can be calculated in the following manner. That is, the color information of R is expressed by n_R/iWr at the coordinates (1,1), and the color information of B is expressed by n_B/iWb at the coordinates (3,3). Further, the color information of G is expressed by an average value between n_G/iWg at the coordinates (3,1) and n_G/iWg at the coordinates (1,3).

The signal combining unit 207 generates the image signal 3g including information of the respective colors of RGB for each pixel on the assumption that the ratio among the respective colors is constant within the 4×4 area. That is, the signal combining unit 207 uses a pixel signal 3c of W and iW generated by the luminance signal processing unit 204 and the color information to generate the image signal 3g. When the pixel of the pixel signal 3c is W, the pixel value of RGB is obtained by the following expression.

$$RGB = \left[ \frac{n\_R}{iWr} W \quad \frac{n\_G}{iWg} W \quad \frac{n\_B}{iWb} W \right]$$

Further, when the pixel of the pixel signal 3c is iW, the pixel value of RGB is obtained by the following expression.

$$RGB = \left[ \frac{n\_R}{iWr} iW \quad \frac{n\_G}{iWg} iW \quad \frac{n\_B}{iWb} iW \right]$$

The color information is standardized by the W pixel value or the iW pixel value. That is, the color information expressed by n_R/iWr, n_G/iWg, and n_B/iWb does not include the luminance information necessary for the resolution, and includes only color information (hue information). Therefore, the pixel value of RGB can be obtained by multiplying the pixel values of W and iW being luminance information by the color information. The pixel values of W and iW being luminance information are not subjected to the inter-frame processing, or are not subjected to low pass filter processing in a sense of time or frequency. This enables generation of an image signal superior in response speed with respect to the motion of the object. The color signal is subjected to the inter-frame processing, and the noise in the pixel values of n_R, n_G, and n_B is reduced, to thereby be able to generate a satisfactory image signal exhibiting few false colors.

In the human visual characteristic, the respective resolution powers (recognition capabilities) of the resolution (luminance) and the color (hue) are different from each other. The capability of sensing colors is not "spatially" or "temporally" high, and the resolution power of the color hardly becomes a problem compared to that of the luminance. That is, as long as the response to the luminance is fast, the RGB image is likely to be recognized as being satisfactory. Meanwhile, when there is a change in the hue that is not included in the object, that is, the false color or the noise component, a sense of discomfort in terms of a visual characteristic becomes large, and the image quality deteriorates. According to this embodiment, the color signal is subjected to the inter-frame processing, and hence an image having little noise can be generated. Further, when the motion of the object is large, afterimages of colors can be reduced by lowering the weight on the past frame in the inter-frame processing.

Figure 9A:
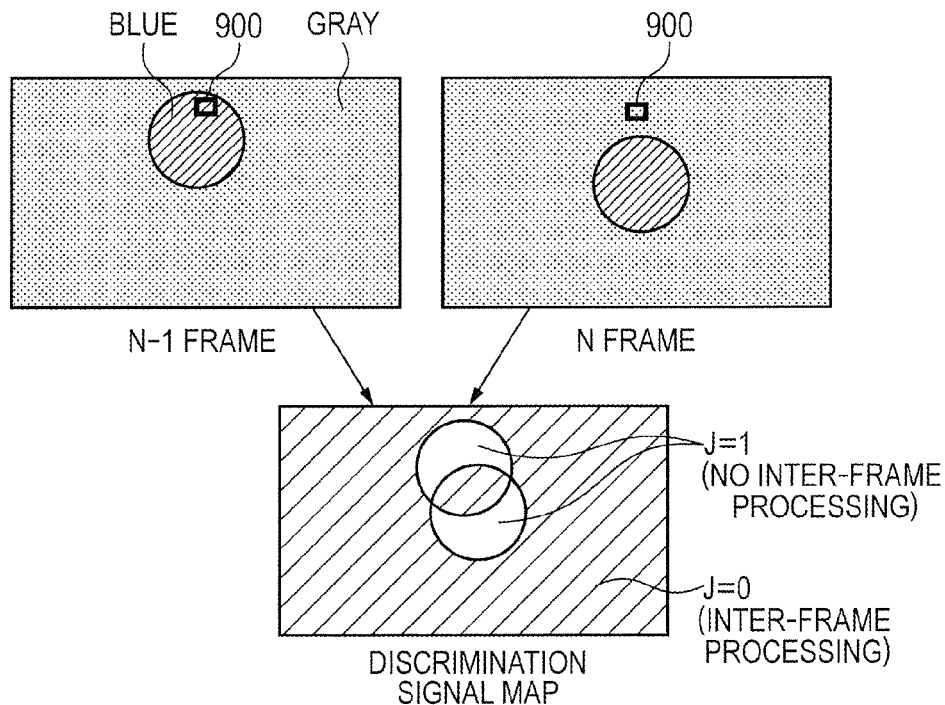
FIG. 9A, FIG. 9B and FIG. 9C are a diagram and graphs for illustrating and showing operations of the control unit and the color signal processing unit according to the first embodiment.
Figure 9B:
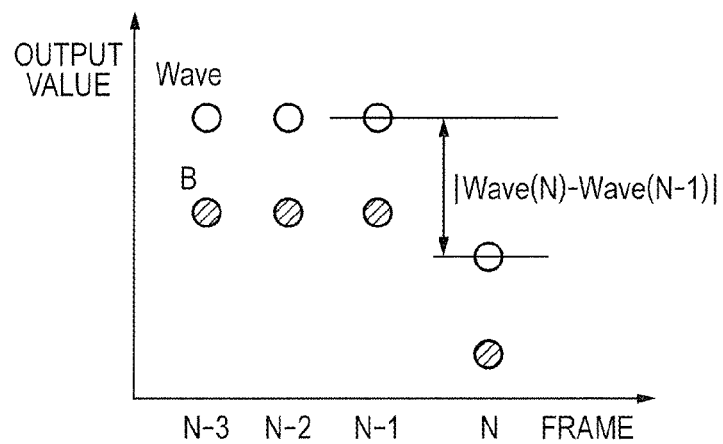
Figure 9C:
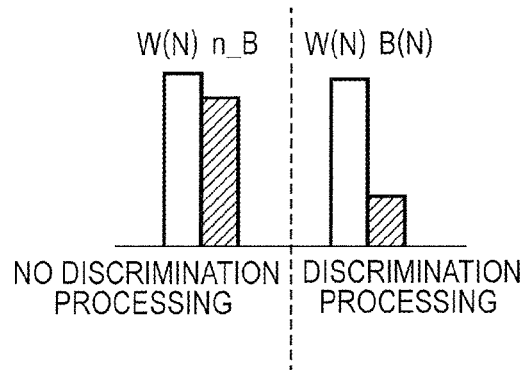

FIG. 9A to FIG. 9C are a diagram and graphs for illustrating and showing operations of the control unit 205 and the color signal processing unit 206 according to this embodiment, and an imaging result of such an object that a blue sphere moves in front of a gray background is illustrated. FIG. 9A is an illustration of a map indicating two frames ((N−1)th frame and N-th frame) different in time and the discrimination signal J on a two-dimensional image. When the blue sphere moves and the absolute value of the differential between the spatial average values $W_{ave}$ (N) and $W_{ave}$ (N−1) in the two frames exceeds the threshold value Vth, the discrimination signal J becomes "1". Therefore, in the area where the discrimination signal J is "1" in FIG. 9A, the inter-frame processing for the color signal is not conducted, or the weight on the past frame becomes small. In an area exhibiting a small change in the luminance, that is, the area where the absolute value of the differential between the spatial average values is equal to or smaller than the threshold value Vth, the discrimination signal J is "0", and the color signal is subjected to the inter-frame processing to reduce the color noise.

FIG. 9B is a graph for showing the spatial average value $W_{ave}$ and the pixel value (output value) of B in each frame of a rectangular area 900 of FIG. 9A. In the (N−3)th frame to the (N−1)th frame, the blue sphere is positioned over the area 900, and hence the pixel value of B within the area 900 is a value shown in the graph. The spatial average value $W_{ave}$ calculated from the pixel value of W is at a higher level than the pixel value of B. When the blue sphere further moves and the area 900 changes from blue to gray during a period from the (N−1)th frame to the N-th frame, the pixel value of B and the spatial average value $W_{ave}$ change. When the absolute value of the differential between the spatial average values $W_{ave}(N)$ and $W_{ave}(N-1)$ exceeds the threshold value Vth, the discrimination signal J becomes "1", and the color signal in the N-th frame is not subjected to the frame inter-frame processing.

FIG. 9C is a graph for showing a result of comparing the discrimination processing between the frames in the examples of FIG. 9A and FIG. 9B. The graph on the left of FIG. 9C is a graph for showing the respective pixel values of W and B in the N-th frame obtained when the discrimination processing between the frames is not conducted. In this case, the pixel value of B subjected to the inter-frame processing is the pixel value of n_B substantially the same as the average value of from the (N−3)th frame to the N-th frame. Meanwhile, the pixel value of W is the value of the N-th frame, and hence the color ratio of the pixel values of W and n_B greatly deviates from an original color ratio for gray, which causes the gray area to be colored blue. Therefore, in the displayed moving image, a belt-like afterimage that follows the moving blue sphere is visually recognized.

The graph on the right of FIG. 9C is a graph for showing the respective pixel values of W and B in the N-th frame obtained when the discrimination processing between the frames is conducted according to this embodiment. In this case, in the area where the absolute value of the differential between the spatial average values $W_{ave}$ in the respective frames is large, the inter-frame processing for the color signal is not conducted. Therefore, the pixel value of B is the value of the N-th frame, and the color ratio of the pixel values of W and B is the original color ratio for gray. That is, in the area where the motion of the object is large, the color ratio is not affected by the past frame, and hence the above-mentioned afterimage of blue does not occur.

In the part exhibiting a large motion, the noise is less liable to become conspicuous, and hence the deterioration in image quality can be suppressed to a minimum even by inhibiting the inter-frame processing from being conducted for the color signal in the part exhibiting a large temporal change of the W pixel. In the part where the temporal change of the W pixel is small, the color noise can be reduced by conducting the inter-frame processing for the color signal. Therefore, both the reduction in color noise and the reduction in color afterimages can be achieved for an entire image, and a high-quality image can be obtained.

FIG. 10 is a table for showing evaluation results of the imaging apparatus according to this embodiment. As evaluation items for an image, noise and an afterimage were used. Interference due to a false color in a moving image was represented by "A", "B", and "C" in order from an excellent evaluation. The evaluation was conducted with a luminance, a number n of frames, and presence or absence of frame discrimination processing being changed as the evaluation conditions. In this case, the number n of frames represents "n" within the factors 1/n and (n−1)/n used in the inter-frame processing. The frame discrimination processing represents the discrimination based on the spatial average value $W_{ave}$ of the W pixels.

As Condition No 1, an ambient luminance was set to 0.1 [lx], the number of frames was set as n=1, and discrimination processing was not conducted. A photographed image did not have a color afterimage which appears as a blurred color, but cannot be said to have had satisfactory image quality due to color noise conspicuous enough to be annoying. Therefore, the evaluation of the noise was "C", and the evaluation of the afterimage was "A".

As Condition No 2, the ambient luminance was set to 0.1 [lx], the number of frames was set as n=4, and the discrimination processing was not conducted. In the photographed image, the color afterimage was somewhat conspicuous, but was at an acceptable level. The color noise was conspicuous, but was at the tolerable level. Therefore, the evaluation of the noise was "B", and the evaluation of the afterimage was "A".

As Condition No 3, the ambient luminance was set to 0.05 [lx], the number of frames was set as n=4, and the discrimination processing was not conducted. In the photographed image, the color afterimage was at an acceptable level, but the color noise was at an annoying level, and satisfactory image quality failed to be obtained. Therefore, the evaluation of the noise was "C", and the evaluation of the afterimage was "A".

As Condition No 4, the ambient luminance was set to 0.05 [lx], the number of frames was set as n=8, and the discrimination processing was not conducted. In the photographed image, the color noise was at an acceptable level. However, because the number of frames to be subjected to averaging was increased, the color afterimage was conspicuous, and the image quality was annoying. Therefore, the evaluation of the noise was "A", and the evaluation of the afterimage was "C".

As Condition No 5, the ambient luminance 0.05 [lx], the number of frames was set as n=8, and the discrimination processing was set conducted. In the photographed image, both the color noise and the color afterimage were both at an acceptable level. Therefore, the evaluations of the noise and the afterimage were both "A".

As described above, according to this embodiment, instead of the Bayer array of RGB, an imaging apparatus having a high sensitivity can be realized through use of CFs having the W pixel. Further, the human visual characteristic is not so sensitive to the temporal change in the color, and hence the color noise can be reduced by subjecting the color signal to the inter-frame processing and conducting noise reduction. The part exhibiting a large temporal change is discriminated to skip the noise reduction, to thereby be able to reduce the color noise and the color afterimages while maintaining the resolution of the moving image. The frame discrimination processing is conducted based on the N pixel having a high resolution, and hence the accuracy in the discrimination can also be increased.

In general, in order to achieve the high sensitivity, when the proportion of N pixels is increased in a given small area, the proportion of RGB pixels decreases, and the color noise increases. This is described as follows. The noise generated in each pixel is a sum of photon shot noise and readout noise, both of which have a characteristic based on a Poisson distribution. Thus, a standard deviation in the small area is proportional to the square root of a number N of pixels. Meanwhile, an average value in a given small area is proportional to the number N of pixels. Therefore, an S/N ratio is proportional to the square root of the number N of pixels, and the S/N ratio becomes higher as the number of pixels becomes larger, that is, an image having small noise can be obtained. With the RGB pixels including a small number of pixels, the color noise is liable to increase, but according to this embodiment, the inter-frame processing enables the color noise to be reduced effectively. The color afterimages can also be reduced by changing the weight for the inter-frame processing based on the object exhibiting a large motion.

Note that, the inter-frame processing is not limited to the IIR filter, and a non-recursive filter (FIR) may be used, or an inter-frame moving average or an inter-frame median filter may be used. In addition, the number of frames for the inter-frame processing is not limited to a fixed value such as 1, 4, and 8, and an adaptive filter configured to appropriately change the value of n depending on an environment (luminance, contrast, moving speed of an object, or the like) of an object may be used. The frames to be used for the inter-frame processing are not limited to adjacent frames, and may be every plurality of frames such as every two frames or every three frames. In addition, an inclination of the pixel values of three or more points among three or more frames may be used to calculate a variation amount (differential or correlation value) between frames.

In this embodiment, an example in which the luminance signal processing unit 204 and the color signal processing unit 206 are provided outside the imaging device 1 is described. As another example, the imaging device 1 may include the luminance signal processing unit 204 and the color signal processing unit 206. The imaging device 1 may be a laminated sensor obtained by laminating a first semiconductor substrate in which an imaging area 101 is formed and a second semiconductor substrate in which the luminance signal processing unit 204 and the color signal processing unit 206 are each formed on one another.

Second Embodiment

Figure 11:
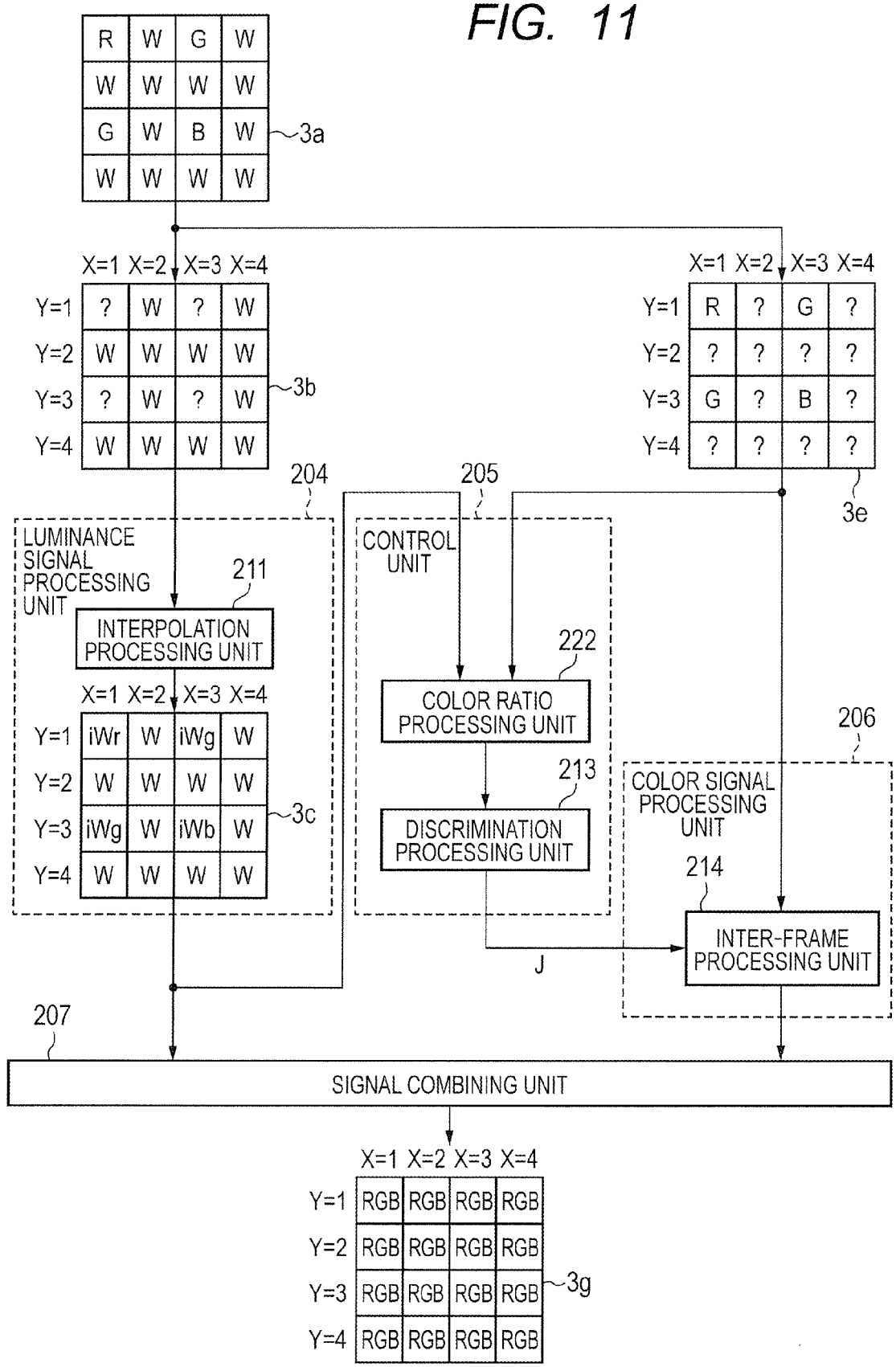
FIG. 11 is a block diagram of the signal processing unit of an imaging apparatus according to a second embodiment of the present invention.

FIG. 11 is a block diagram of the signal processing unit 2 of an imaging apparatus according to a second embodiment of the present invention. In the first embodiment, the discrimination of the inter-frame processing is conducted based on the average value $W_{ave}$ of the pixel values of W, but in this embodiment, the discrimination of the inter-frame processing is conducted based on the color ratio information. The imaging apparatus according to the second embodiment is described below mainly in terms of points different from those of the first embodiment.

The control unit 205 includes a color ratio processing unit 222 and the discrimination processing unit 213, and the pixel signal 3c of W subjected to the interpolation and the pixel signal 3e of RGB are input to the color ratio processing unit 222.

The color ratio processing unit 222 is configured to calculate ratios of the pixel values of iWr, iWg, and iWb subjected to the interpolation and the pixel values of R, G, and B, respectively, and to output the color ratio information. The color ratio is calculated in accordance with expressions of R/iWr, G/iWg, and B/iWb.

The discrimination processing unit 213 is configured to compare the absolute value of an inter-frame differential of the color ratio information with the threshold value Vth, and to output the discrimination signal J based on the comparison result. For example, the discrimination signal J based on a color ratio of B/iWb is obtained by the following expressions.

$$\left| \frac{B(N)}{iWb(N)} - \frac{B(N-1)}{iWb(N-1)} \right| > Vth \rightarrow J = 1$$

$$\left| \frac{B(N)}{iWb(N)} - \frac{B(N-1)}{iWb(N-1)} \right| \leq Vth \rightarrow J = 0$$

In the above-mentioned expressions, B(N) and iWb(N) represent the pixel value of B and the pixel value of iWb the N-th frame, and B(N−1) and iWb(N−1) represent the pixel value of B and the pixel value of iWb in the (N−1)th frame. The discrimination signals J for the pixel values of R and G can also be obtained in the same manner. In this case, the discrimination signal J can be obtained for each of R, G, and B to change the weight for the inter-frame processing. The discrimination signal J may be determined based on the color ratio that causes the absolute value of the differential to become maximum, and moreover, the discrimination signal J may be determined through use of an average value of the color ratios. It is desired that the threshold value Vth be a value equal to or smaller than 1 and be set to an optimum value based on the imaging results of various objects. The threshold value Vth may be changed dynamically based on photographing conditions such as an illuminance of the object and a color temperature of illumination.

Figure 12A:
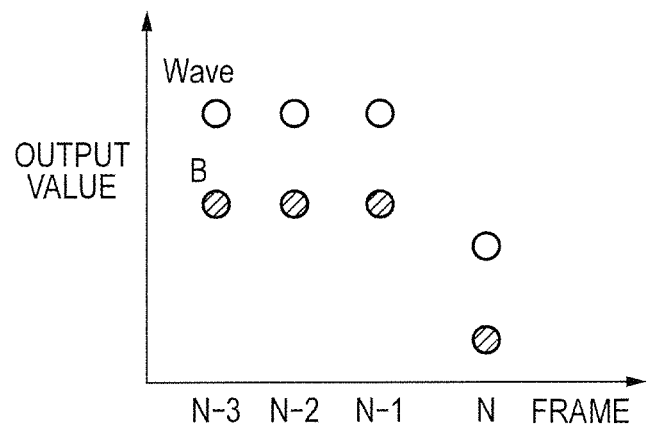
FIG. 12A and FIG. 12B are graphs for showing an action of inter-frame processing according to the second embodiment.
Figure 12B:
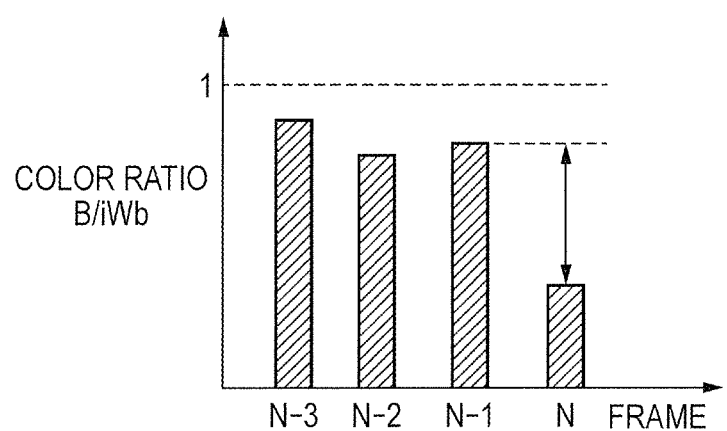

FIG. 12A and FIG. 12B are graphs for showing the operations of the control unit 205 and the color signal processing unit 206 according to this embodiment. FIG. 12A is a graph for showing the respective pixel values of iWb and B in each frame, and FIG. 12B is a graph for showing the color ratio information in each frame. In the same manner as FIG. 9A to FIG. 9C, FIG. 12A and FIG. 12B are graphs for showing an imaging result of such an object that a blue sphere moves in front of a gray background, and for showing changes in the respective values within the area 900 from the (N−3)th frame to the N-th frame. In the (N−3)th frame to the (N−1)th frame, the change in the color ratio information B/iWb is small, and hence the absolute value of the inter-frame differential of the color ratio information is equal to or smaller than the threshold value Vth. Therefore, the discrimination signal J is "0", and the inter-frame processing unit 214 conducts the inter-frame processing for the color signal, and conducts the noise reduction for the color signal. When the area 900 changes from blue to gray during the period from the (N−1)th frame to the N-th frame, the color ratio information of the pixel value of B and the pixel value of iWb changes. When the absolute value of the inter-frame differential of the color ratio information B/iWb exceeds the threshold value Vth, the discrimination signal J becomes "1", and the inter-frame processing for the color signal is not conducted. Therefore, the color afterimage that can be caused by referring to the past frame can be suppressed.

In this embodiment, the weight for the inter-frame processing is changed based on the color ratio, and hence an arithmetic operation processing amount can increase compared to the first embodiment in which the weight is changed based on the pixel value of W, but the color afterimage can be suppressed effectively. A major cause of an occurrence of a color afterimage due to the inter-frame processing (noise reduction) of the color signal processing is a drastic change in the color ratio. Therefore, it is possible to effectively suppress the color afterimage by discriminating whether or not to conduct the inter-frame processing for the color signal based on the change in the color ratio (differential). In the RGBW12 array, the RGB pixels are each surrounded by the W pixels, and hence the pixel value of W in the position of the RGB pixel can be interpolated with high accuracy. Therefore, the color ratio can be calculated with high accuracy, and it is possible to improve the accuracy in the discrimination of the inter-frame processing.

As described above, according to this embodiment, the weight on each frame in the inter-frame processing for the color signal is changed through use of the color ratio. The color ratio is used for the discrimination, to thereby be able to prevent the inter-frame processing from being conducted so as to deviate from the original color ratio, and to prevent an occurrence of a colored afterimage with high accuracy. That is, it is possible to conduct the discrimination of the inter-frame processing with higher accuracy than in the first embodiment, and the color afterimages can be further reduced.

In the discrimination of the inter-frame processing, a color difference between the pixel value of iW and the pixel value of RGB may be used instead of the color ratio. That is, when the color difference between the frames is equal to or smaller than the threshold value Vth, the inter-frame processing for the color signal is executed, and when the color difference between the frames exceeds the threshold value Vth, the inter-frame processing for the color signal may be inhibited from being executed.

Third Embodiment

Figure 13:
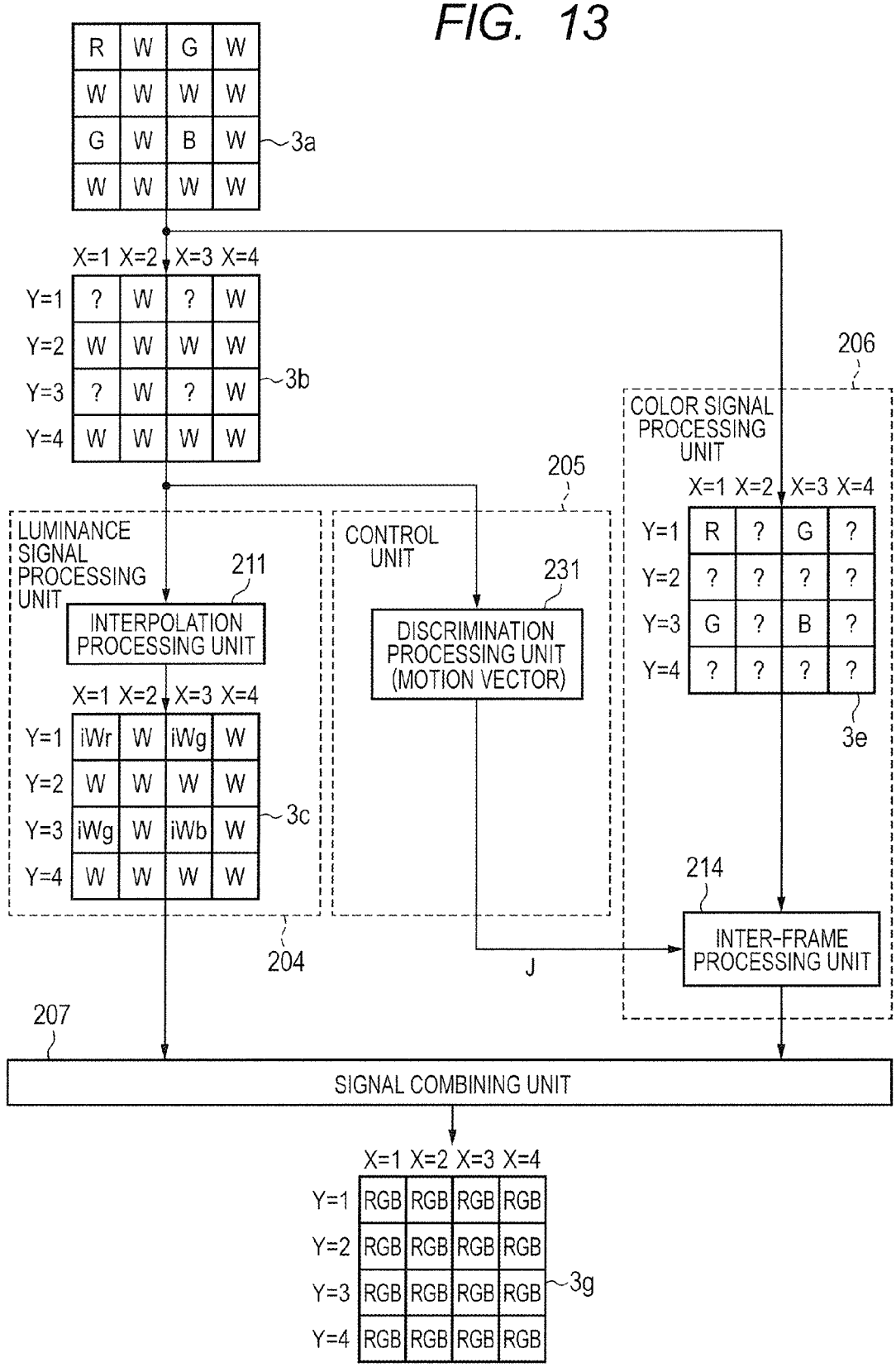
FIG. 13 is a block diagram of the signal processing unit of an imaging apparatus according to a third embodiment of the present invention.

FIG. 13 is a block diagram of the signal processing unit 2 of an imaging apparatus according to a third embodiment of the present invention. This embodiment is different from the first embodiment in that the discrimination of the inter-frame processing is conducted based on a motion vector using the W pixels in a plurality of frames. The imaging apparatus according to this embodiment is described below mainly in terms of points different from those of the first embodiment.

A discrimination processing unit 231 is configured to calculate a motion vector by a block matching method, and to determine the determination signal J based on a comparison result between the absolute value of the motion vector and the threshold value Vth.

Figure 14A:
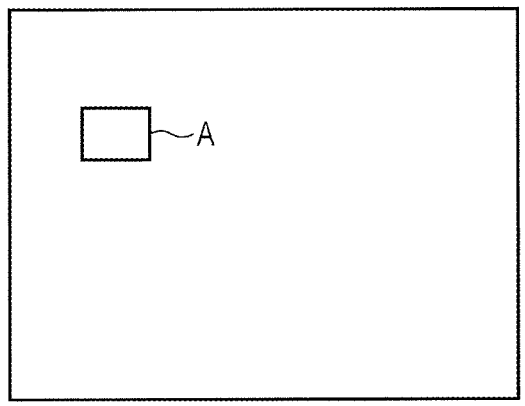
FIG. 14A and FIG. 14B are illustrations of an operation of a discrimination processing unit according to the third embodiment.
Figure 14B:
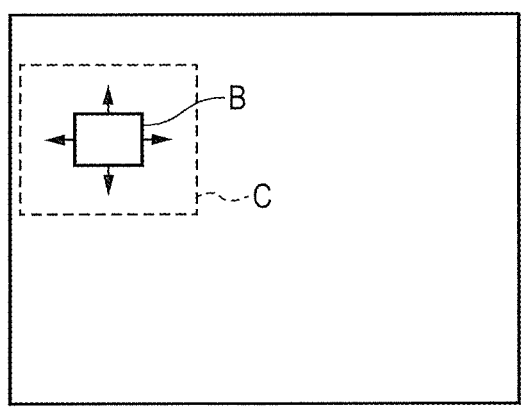

FIG. 14A and FIG. 14B are illustrations of an operation of the discrimination processing unit 231 according to this embodiment, and a basic frame and a reference frame for use in the block matching method are illustrated. In FIG. 14A, the discrimination processing unit 231 sets a window area A within the basic frame, and searches the reference frame for a pattern similar to a pattern within the window area A. As the reference frame, the N-th frame subsequent to the (N−1)th frame is used.

As illustrated in FIG. 14B, normally, a predetermined range C with a position B exhibiting a moving amount of zero being used as a reference is set as a search range. A similarity between patterns can be determined by using a sum of squared difference (SSD) expressed by the following expression as an evaluation value.

$$SSD = \sum_{x,y \in W} (f(x+u, y+v, t+\Delta t) - f(x, y, t))^2$$

In this expression, f(x,y,t) represents a space-time distribution of an image, and x,y∈W means coordinate values of a pixel included in a window area of the basic frame.

The discrimination processing unit 231 changes (u,v) within the search range to search for a combination of (u,v) exhibiting the minimum evaluation value, and sets this (u,v) as the motion vector between the frames. The discrimination processing unit 213 sequentially shifts the position of the window area, to thereby obtain the motion vector for each pixel or each block (for example, 8×8 pixels).

The W pixels having a larger number of pixels and a higher sensitivity than the RGB pixels are used for motion detection, to thereby be able to increase a spatial resolution of the motion vector and increase a tolerance to noise in the calculation of the motion vector.

When the absolute value of the motion vector exceeds the threshold value Vth, the discrimination processing unit 213 sets the discrimination signal J to "1". In this case, the inter-frame processing unit 214 reduces the number of frames to be subjected to the inter-frame processing for the color signal, or inhibits the inter-frame processing from being conducted. With this operation, it is possible to suppress the color afterimage caused by conducting the color signal processing for a part exhibiting a motion. Meanwhile, when the absolute value of the motion vector is equal to or smaller than the threshold value Vth, the discrimination signal J is "0", and the inter-frame processing unit 214 conducts the inter-frame processing for the color signal, and conducts the noise reduction for the color signal.

This embodiment can also produce the same effects as those of the first and second embodiments. In addition, in this embodiment, it is determined whether or not to conduct the inter-frame processing for the color signal depending on a magnitude of the motion vector within the W pixels. The W pixels have a high spatial resolution and a high sensitivity, and hence the discrimination of the inter-frame processing can be conducted with high accuracy. As a result, it is possible to obtain an effect of the noise reduction for the color signal while further reducing the color afterimages.

Fourth Embodiment

Figure 15:
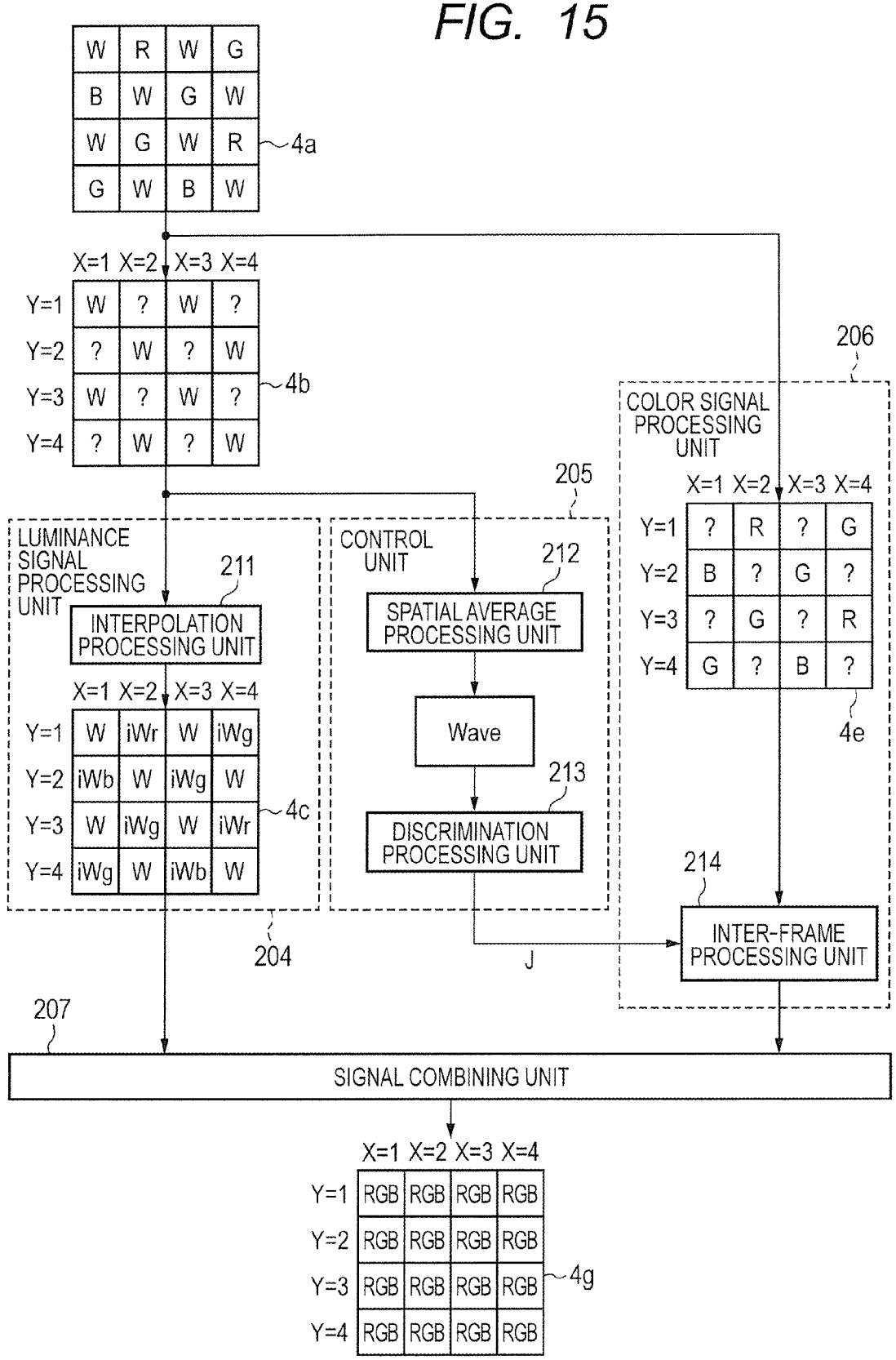
FIG. 15 is a block diagram of the signal processing unit of an imaging apparatus according to a fourth embodiment of the present invention.

FIG. 15 is a block diagram of the signal processing unit 2 of an imaging apparatus according to a fourth embodiment of the present invention. The imaging apparatus according to this embodiment is different from the imaging apparatus according to the first embodiment in that the RGBW8 array illustrated in FIG. 4C is used. The imaging apparatus according to the fourth embodiment is described below mainly in terms of points different from those of the first embodiment.

In the RGBW8 array, the number of W pixels is smaller than that of the RGBW12 array, and hence the sensitivity is lower. Meanwhile, RGB pixels exist around W pixels, and hence the false color is less liable to occur. In FIG. 15, a pixel signal 4a of the CF array of RGBW8 is separated into a pixel signal 4b of W being a luminance signal and a pixel signal 4e of RGB being a color signal.

The luminance signal processing unit 204 obtains a pixel value in each of parts from which the RGB pixels have been separated within the pixel signal 4b by the interpolation processing, and generates a pixel signal 4c subjected to the interpolation. The interpolated pixels are represented by "iWr", "iWg", and "iWb".

The control unit 205 includes the spatial average processing unit 212 and the discrimination processing unit 213. The spatial average processing unit 212 is configured to calculate the average value $W_{ave}$ of the pixel values for a predetermined block within the pixel signal 4b of W. The discrimination processing unit 213 is configured to compare the inter-frame differential of the average value $W_{ave}$ with the threshold value Vth. When the absolute value of the inter-frame differential is larger than the threshold value Vth, the discrimination signal J is "1", and when the absolute value of the inter-frame differential is equal to or smaller than the threshold value Vth, the discrimination signal J is "0".

$$|W_{ave}(N)-W_{ave}(N-1)|>Vth \rightarrow J=1$$

$$|W_{ave}(N)-W_{ave}(N-1)|\leq Vth \rightarrow J=0$$

The color signal processing unit 206 includes the inter-frame processing unit 214. The processing of the inter-frame processing unit 214 is configured in the same manner as in the first embodiment. That is, when the discrimination signal J is "1", the inter-frame processing unit 214 reduces the number of frames to be subjected to the inter-frame processing for the color signal, or inhibits the inter-frame processing from being conducted. That is, when the temporal change of the pixel value of W is large, it is possible to reduce the color afterimages caused by the object exhibiting a motion by reducing the number of frames to be subjected to the inter-frame processing for the color signal.

The signal combining unit 207 combines the pixel signal 4c of W subjected to the interpolation and a pixel signal of RGB subjected to the color signal processing. That is, the signal combining unit 207 calculates the color ratio of the pixel values of W and iW and the pixel values of n_R, n_G, and n_B in the same position, and multiplies the color ratio by the pixel values of W and iW, to thereby calculate the value of RGB for each pixel. In the same manner as in the first embodiment, the pixel value of RGB is obtained by one of the following expressions for each of the pixels of W and iW.

$$RGB = \left[ \frac{n\_R}{iWr}W \quad \frac{n\_G}{iWg}W \quad \frac{n\_B}{iWb}W \right]$$

$$RGB = \left[ \frac{n\_R}{iWr}iW \quad \frac{n\_G}{iWg}iW \quad \frac{n\_B}{iWb}iW \right]$$

In this embodiment, through the use of the RGBW8 array, the sensitivity and the resolution of an image became lower than the first embodiment, but the reduction in the false colors was enabled depending on the design pattern of an object.

Fifth Embodiment

Figure 16:
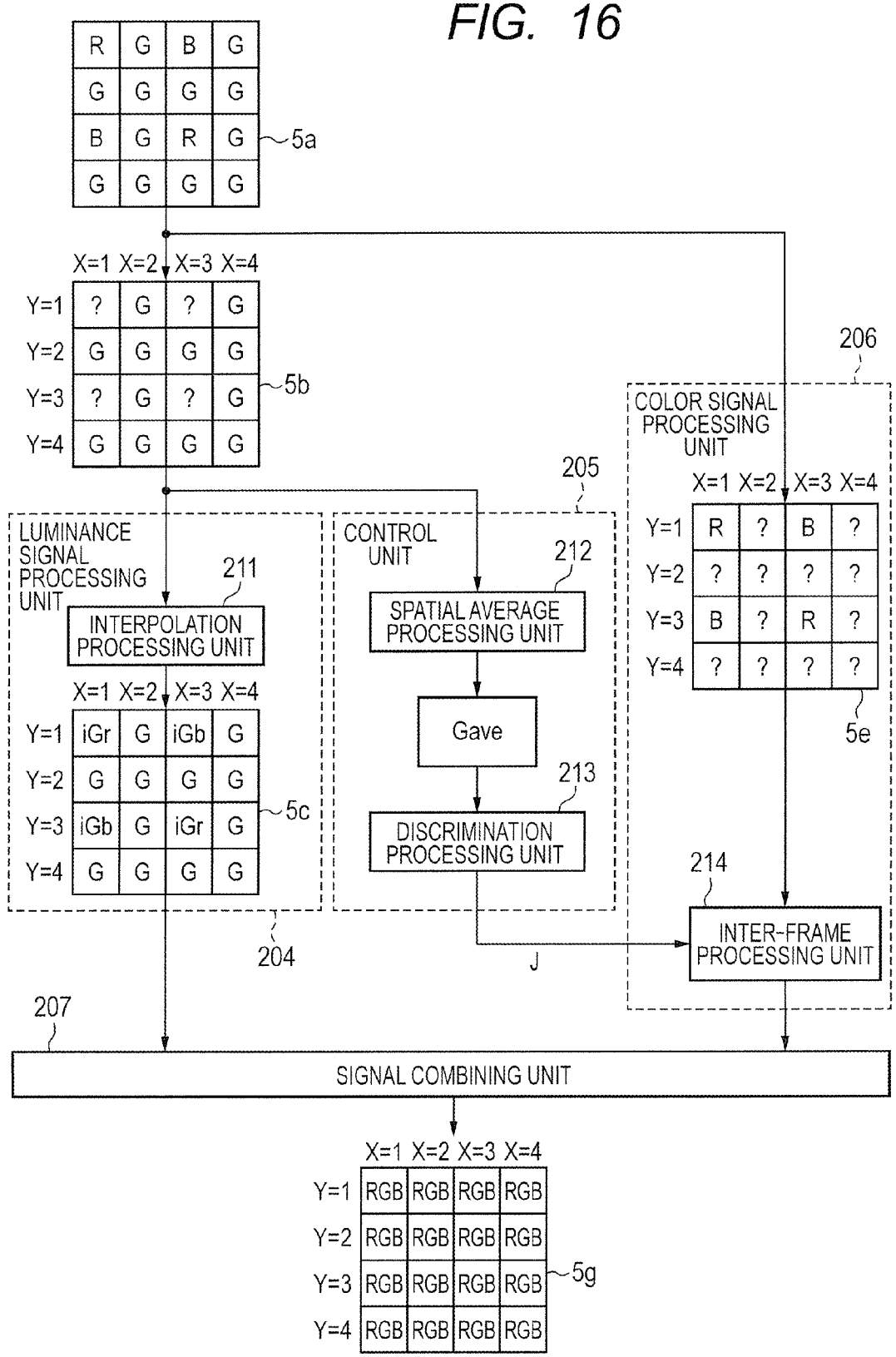
FIG. 16 is a block diagram of the signal processing unit of an imaging apparatus according to a fifth embodiment of the present invention.

FIG. 16 is a block diagram of the signal processing unit 2 of an imaging apparatus according to a fifth embodiment of the present invention. The imaging apparatus according to this embodiment is different from the imaging apparatus according to the first embodiment in that the RGBG12 array illustrated in FIG. 4D is used. The imaging apparatus according to the fifth embodiment is described below mainly in terms of points different from those of the first embodiment.

In the RGBG12 array, the W pixel of RGBW12 is replaced by the G pixel, and hence the sensitivity is liable to be lowered. However, the W pixel exhibits a higher sensitivity than the RGB pixel, and hence, when an image of the object having a high luminance is picked up, the W pixel can be saturated, and the dynamic range can be lowered. In this embodiment, through the use of the CFs of the RGBG12 array, the sensitivity and the saturation of the signal can be balanced.

In FIG. 16, the pixel signal 5a is separated into a pixel signal 5b of G and a pixel signal 5e of R and B.

The luminance signal processing unit 204 conducts interpolation processing for parts from which the pixels of R and B have been separated within the pixel signal 5b to generate pixel values of iGr and iGb. The spatial average processing unit 212 calculates the average value $W_{ave}$ of the pixel values of G within a predetermined block of the pixel signal 5b of G. The discrimination processing unit 213 compares the inter-frame differential of the average value $W_{ave}$ with the threshold value Vth. When the absolute value of the inter-frame differential is larger than the threshold value Vth, the discrimination signal J is "1", and when the absolute value of the inter-frame differential is equal to or smaller than the threshold value Vth, the discrimination signal J is "0".

$$|G_{ave}(N)-G_{ave}(N-1)|>Vth \rightarrow J=1$$

$$|G_{ave}(N)-G_{ave}(N-1)|\leq Vth \rightarrow J=0$$

The sensitivity of the G pixel is lower than the sensitivity of the W pixel, but the G pixel includes a larger amount of luminance information than the pixels of R and B. When an object moves, not only the color but also the luminance often changes. Therefore, the inter-frame differential of the G pixel is obtained, to thereby be able to increase the accuracy in the discrimination of the inter-frame processing.

The color signal processing unit 206 conducts the inter-frame processing for a pixel signal 5e of R and B. The processing of the inter-frame processing unit 214 is the same as that of the first embodiment. When the discrimination signal J is "1", the inter-frame processing unit 214 reduces the number of frames to be subjected to the inter-frame processing to a smaller number than when the discrimination signal J is "0", or inhibits the inter-frame processing from being conducted. That is, when the temporal change of the pixel value of G is large, the number of frames to be subjected to the inter-frame processing for the color signal is reduced. With this operation, it is possible to reduce the colored afterimages caused by the object exhibiting a motion.

The signal combining unit 207 combines a pixel signal 5c of G subjected to the interpolation and the inter-frame processed pixel signals of R and B. That is, the signal combining unit 207 calculates the color ratio of the pixel values of G and iG and the pixel values of n_R and n_B in the same position, and multiplies the color ratio by the pixel values of G and iG, to thereby calculate the value of RGB for each pixel. The pixel value of RGB is obtained by one of the following expressions for each of the pixels of G and iG.

$$RGB = \left[ \frac{n\_R}{iWr}W \quad \frac{n\_G}{iWg}W \quad \frac{n\_B}{iWb}W \right]$$

$$RGB = \left[ \frac{n\_R}{iWr}iW \quad \frac{n\_G}{iWg}iW \quad \frac{n\_B}{iWb}iW \right]$$

In a photographed image, the sensitivity and the resolution were lower than in the first embodiment, but through use of RGB pixels, the reduction in the false colors caused when a moving image was being photographed was enabled while the saturation was suppressed. In this manner, the luminance signal is not limited to the signal of the W pixel unlike in the first embodiment, and it suffices that the luminance signal is information of a pixel including a large amount of luminance information (for example, G pixel) in a visual characteristic. Further, it suffices that the color signal is the signal of a pixel including a relatively small amount of luminance information (for example, R pixel and B pixel). In addition, in this embodiment, the pixel signal 5a is separated into the pixel signal 5b of G and the pixel signal 5e of R and B, but the same effects can be produced also by separating the data including a large amount of luminance information and the data including a small amount of luminance information through an arithmetic operation.

Sixth Embodiment

Figure 17:
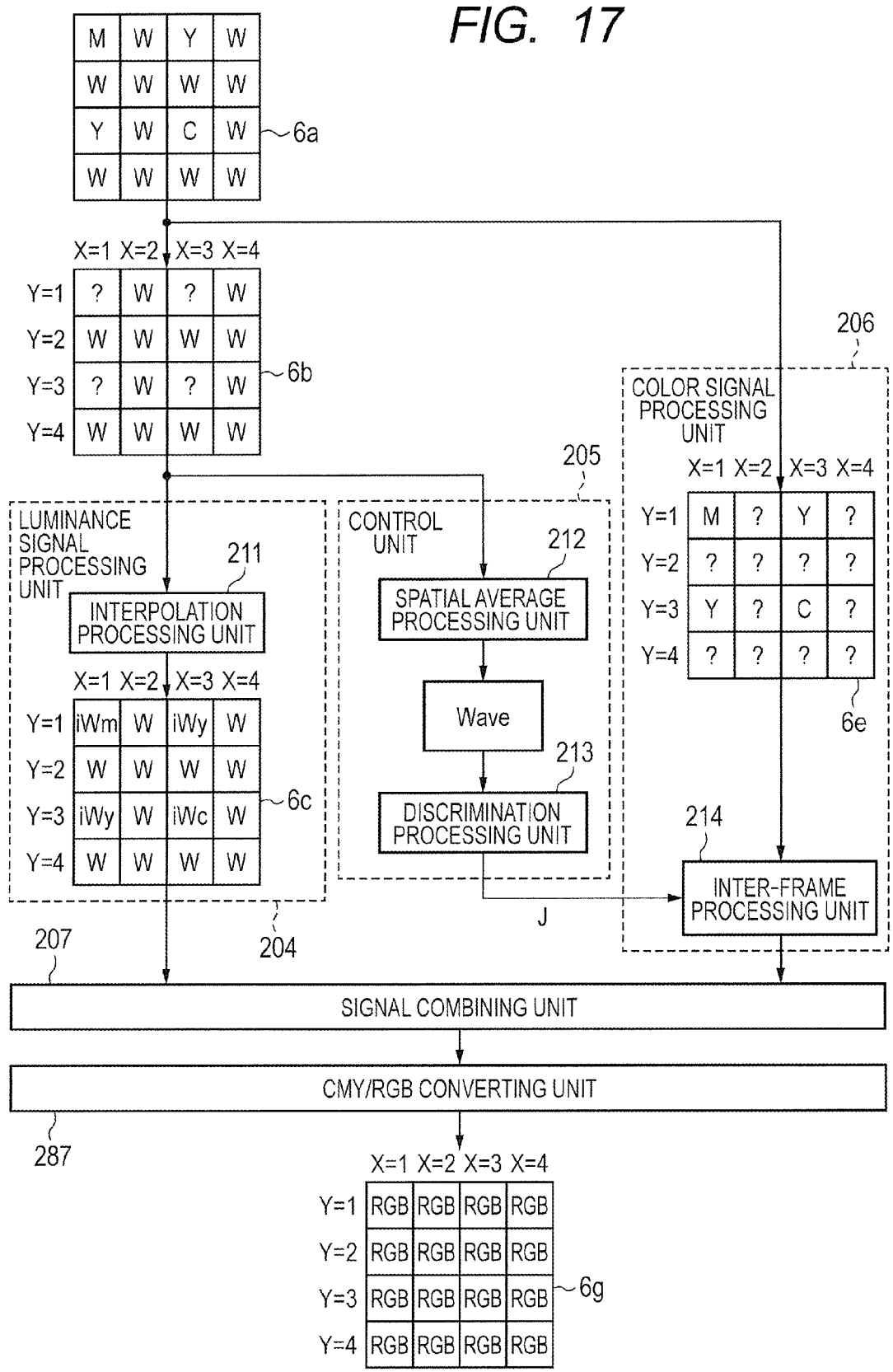
FIG. 17 is a block diagram of the signal processing unit of an imaging apparatus according to a sixth embodiment of the present invention.

FIG. 17 is a block diagram of the signal processing unit 2 of an imaging apparatus according to a sixth embodiment of the present invention.

The imaging apparatus according to this embodiment is described below mainly in terms of points different from those of the first embodiment. In this embodiment, the imaging device 1 uses a CMYW12 array illustrated in FIG. 5B. The CMYW12 array uses the W pixels in addition to the pixels of complementary colors (C, M, and Y) having a high sensitivity, to thereby be able to improve the sensitivity.

In FIG. 17, a pixel signal 6a received from the imaging device 1 is separated into a pixel signal 6b of W and pixel signals 6e of C, M, and Y.

The luminance signal processing unit 204 conducts interpolation processing for parts from which the pixels of C, M, and Y have been separated within the pixel signal 6b to generate the pixel values of iWc, iWm, and iWy. The spatial average processing unit 212 of the control unit 205 calculates the average value $W_{ave}$ of the pixel values within a predetermined block of the pixel signal 6b of W. The discrimination processing unit 213 compares the inter-frame differential of the average value $W_{ave}$ with the threshold value Vth. When the absolute value of the inter-frame differential is larger than the threshold value Vth, the discrimination signal J is "1", and when the absolute value of the inter-frame differential is equal to or smaller than the threshold value Vth, the discrimination signal J is "0".

$|W_{ave}(N)-W_{ave}(N-1)|>Vth \rightarrow J=1$ $|W_{ave}(N)-W_{ave}(N-1)| \leq Vth \rightarrow J=0$ The inter-frame processing unit 214 of the color signal processing unit 206 conducts the inter-frame processing for a pixel signal of CMY being a second pixel group. When the discrimination signal J is "1", the inter-frame processing unit 214 reduces the number of frames to be subjected to the inter-frame processing to a smaller number than when the discrimination signal J is "0", or inhibits the inter-frame processing from being conducted. With this operation, it is possible to reduce the colored afterimages caused by a motion of the object exhibiting the motion. The signal combining unit 207 combines a pixel signal 6c of W subjected to the interpolation and the pixel signal of CMY subjected to the color signal processing. That is, the signal combining unit 207 calculates of the color ratio of the pixel values of W and iW and the pixel values of n_C, n_M, and n_Y in the same position, and multiplies the color ratio by the pixel values of W and iW, to thereby calculate the value of CMY for each pixel. The pixel value of CMY is obtained by one of the following expressions for each of the pixels of W and iW.

$$CMY = \left[ \frac{n\_C}{iWc}W \quad \frac{n\_M}{iWm}W \quad \frac{n\_Y}{iWy}W \right]$$

$$CMY = \left[ \frac{n\_C}{iWc}iW \quad \frac{n\_M}{iWm}iW \quad \frac{n\_Y}{iWy}iW \right]$$

A CMY/RGB converting unit 287 converts the pixel values of CMY output from the signal combining unit 207 into the pixel value of RGB, and outputs an image signal 6g. The imaging apparatus used to conduct the above-mentioned processing was used to conduct evaluation photographing. The sensitivity was higher than in the imaging apparatus according to the first embodiment even though color reproducibility was lower partially in an image pattern, and the false color caused when a moving image was being photographed was suppressed. The processing of the signal combining unit 207 may be executed after the processing of the CMY/RGB converting unit 287, or the two pieces of processing may be executed integrally.

Seventh Embodiment

Figure 18:
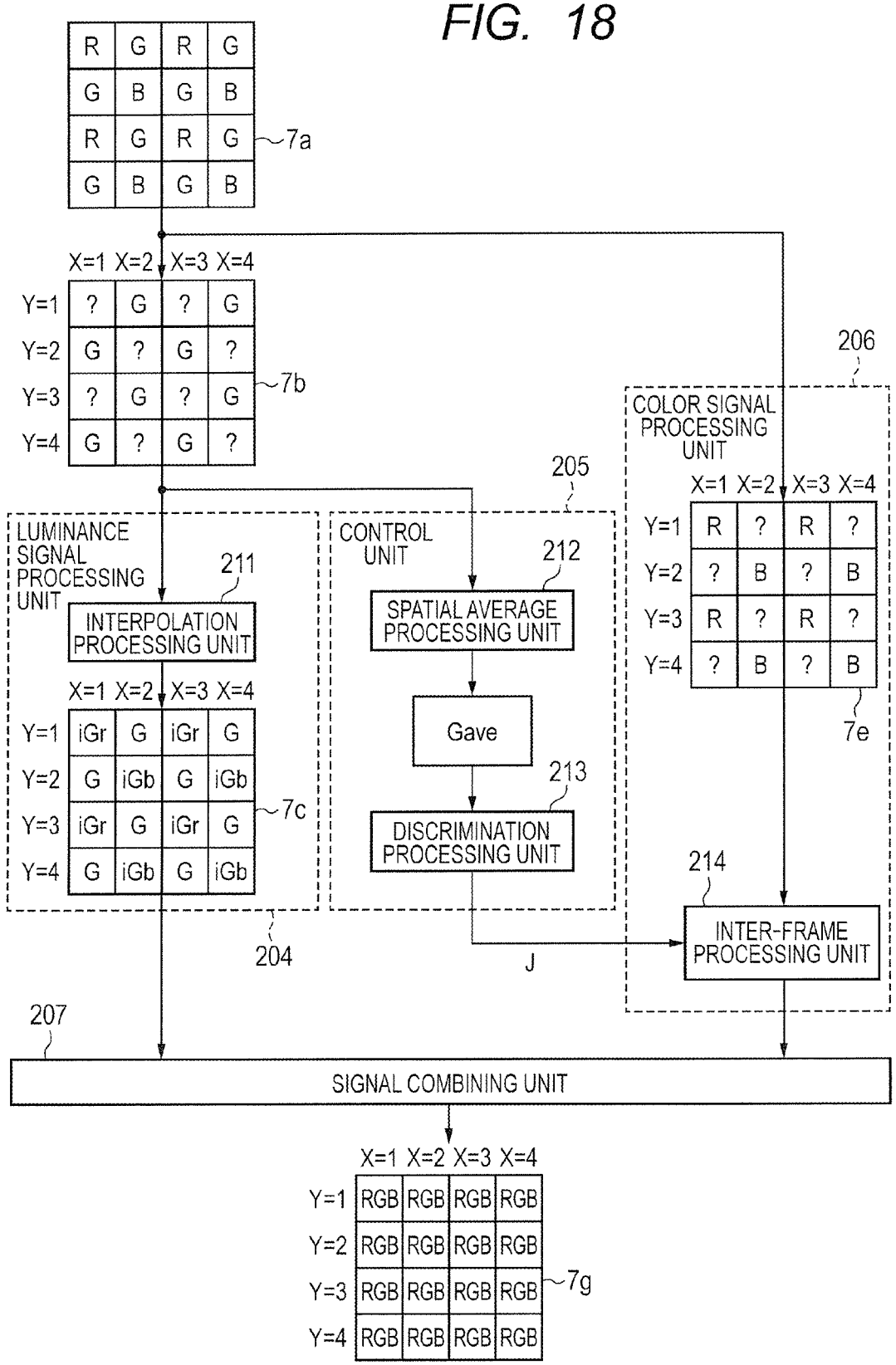
FIG. 18 is a block diagram of the signal processing unit of an imaging apparatus according to a seventh embodiment of the present invention.

FIG. 18 is a block diagram of the signal processing unit 2 of an imaging apparatus according to a seventh embodiment of the present invention. The imaging apparatus according to this embodiment is described below mainly in terms of points different from those of the first embodiment. In this embodiment, the imaging device 1 uses the Bayer (RGB) array illustrated in FIG. 4A. The luminance signal processing unit 204 conducts processing through use of the pixel value of G as the luminance signal, and the color signal processing unit 206 conducts processing through use of the pixel values of R and B as color signals. The Bayer array has a characteristic of having a lower sensitivity than the CFs using W pixels. However, according to this embodiment, the pixel values of R and B having relatively low sensitivity are subjected to the inter-frame processing, to thereby be able to suppress the color noise caused when the illuminance is low. Further, the discrimination of the inter-frame processing is conducted through use of the G pixel having a higher sensitivity and a higher resolution than the pixels of R and B, to thereby be able to improve the accuracy in the discrimination and reduce the color afterimages.

In FIG. 18, a pixel signal 7a of the Bayer (RGB) array is separated into a pixel signal 7b of G and a pixel signal 7e of RB.

The luminance signal processing unit 204 conducts interpolation processing for parts from which the pixels of R and B have been separated to generate the pixel values of iGr and iGb. The spatial average processing unit 212 of the control unit 205 calculates an average value $G_{ave}$ of the pixel values within a predetermined block of the pixel signal 7b of G. The discrimination processing unit 213 obtains the inter-frame differential for the spatial average value of the G pixel, and compares the inter-frame differential with the threshold value Vth. When the absolute value of the inter-frame differential is larger than the threshold value Vth, the discrimination signal J is "1", and when the absolute value of the inter-frame differential is equal to or smaller than the threshold value Vth, the discrimination signal J is "0".

$|G_{ave}(N)-G_{ave}(N-1)|>Vth \rightarrow J=1$ $|G_{ave}(N)-G_{ave}(N-1)| \leq Vth \rightarrow J=0$ The color signal processing unit 206 conducts the inter-frame processing for the RB pixel signal 7e of RB. That is, when the discrimination signal J is "1", the inter-frame processing unit 214 reduces the number of frames to be subjected to the inter-frame processing to a smaller number than when the discrimination signal J is "0", or inhibits the inter-frame processing from being conducted. That is, when the temporal change of the pixel value of G is large, the number of frames to be subjected to the inter-frame processing for the color signal is reduced. With this operation, it is possible to reduce the color afterimages caused by the object exhibiting a motion.

The signal combining unit 207 combines a pixel signal 7c of G subjected to the interpolation and the inter-frame processed pixel signals of RB. The signal combining unit 207 calculates the color ratio of the pixel values of G and iG and the pixel values of n_R and n_B in the same position, and multiplies the color ratio by the pixel values of G and iG. Therefore, the value of RGB is calculated for each pixel, and an image signal 7g is generated. The image value of RGB is obtained by one of the following expressions for each of the pixels of G and iG.

$$RGB = \left[ \frac{n\_R}{iGr} G \quad G \quad \frac{n\_B}{iGb} G \right]$$

$$RGB = \left[ \frac{n\_R}{iGr} iG \quad iG \quad \frac{n\_B}{iGb} iG \right]$$

In a photographed image, both the reduction in color noise and the reduction in color afterimages can be achieved with a low illuminance through the use of the CFs of the Bayer array.

Eighth Embodiment

Figure 19:
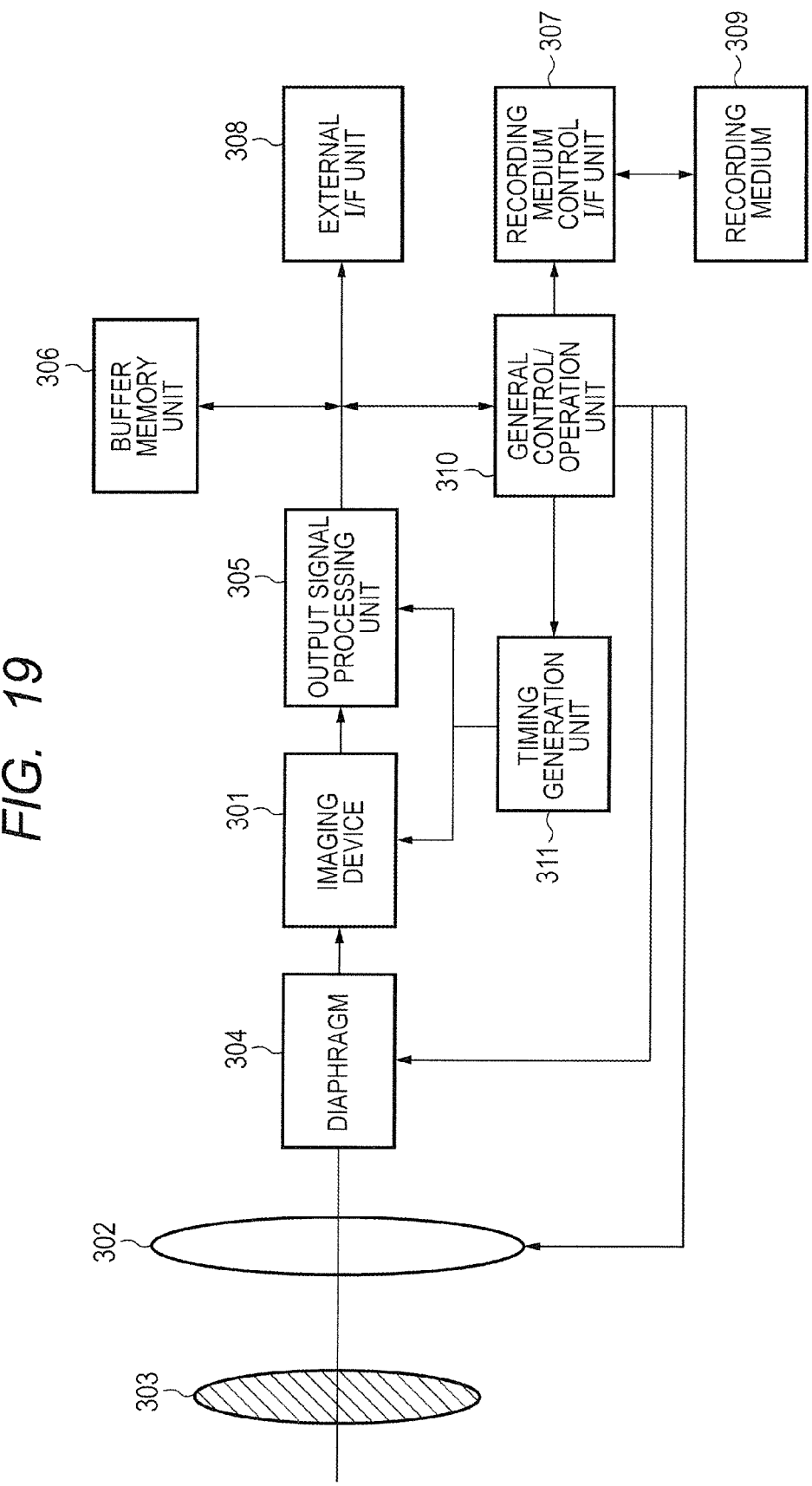
FIG. 19 is a diagram for illustrating an example of a configuration of an imaging system according to an eighth embodiment of the present invention.

An imaging system according to an eighth embodiment of the present invention is described. The imaging apparatus according to the above-mentioned first to seventh embodiments can be applied to various imaging systems. The imaging system is an apparatus configured to acquire an image, a moving image, and the like through use of the imaging apparatus, and examples thereof include a digital still camera, a digital camcorder, and a surveillance camera. FIG. 19 is a block diagram for illustrating a system in which the imaging apparatus according to one of the first to seventh embodiments is applied to a digital still camera employed as an example of the imaging system.

In FIG. 19, the imaging system includes a lens 302 configured to image an optical image of an object on an imaging apparatus 301, a barrier 303 for protection of the lens 302, and a diaphragm 304 for adjustment of an amount of light that has passed through the lens 302. The imaging system includes an output signal processing unit 305 configured to process an output signal output from the imaging apparatus 301.

The output signal processing unit 305 includes a digital signal processing unit, and is further configured to conduct an operation of subjecting the signal output from the imaging apparatus 301 to various kinds of correction and compression as the need arises, and outputting the signal. When the signal output from the imaging apparatus 301 is an analog signal, the output signal processing unit 305 may include an analog-to-digital conversion circuit in the previous stage of the digital signal processing unit.

The imaging system includes a buffer memory unit 306 for temporarily storing image data and a recording medium control interface (I/F) unit 307 for conducting recording or reading into or from the recording medium. The imaging system further includes a recording medium 309 for recording or reading the image data, such as a semiconductor memory, which can be inserted into or removed from the imaging system or is built into the imaging system. The imaging system further includes an external interface (I/F) unit 308 for communicating to or from an external computer or the like and a general control/operation unit 310 configured to conducting various arithmetic operations and overall control of the digital still camera. The imaging system further includes a timing generation unit 311 configured to output various timing signals to the output signal processing unit 305. A control signal such as a timing signal may be input from the outside instead of from the timing generation unit 311. That is, it suffices that the imaging system includes at least the imaging apparatus 301 and the output signal processing unit 305 configured to process an output signal output from the imaging apparatus 301.

As described above, the imaging system according to this embodiment can conduct an imaging operation through application of the imaging apparatus 301 described in the first to seventh embodiments.

Other Embodiments

While an imaging apparatus in the present invention has been described, the present invention is not limited to the embodiments given above, and the embodiments are not to inhibit suitable modifications and variations that fit the spirit of the present invention. For example, the configurations of the above-mentioned first to eighth embodiments can also be combined. The imaging apparatus does not necessarily include an imaging device, and may be an image processing system such as a computer configured to process an image signal output from the imaging device.

Embodiment(s) of the present invention can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-101706, filed May 19, 2015, which is hereby incorporated by reference herein in its entirety.

What is claimed is:

1. An imaging apparatus, comprising:
an imaging device; and
a signal processing unit, wherein:
the imaging device comprises a first pixel group and a second pixel group each comprising a plurality of pixels each configured to output a pixel signal;
the pixel signal output by the plurality of pixels of the second pixel group includes a smaller amount of resolution information than an amount of resolution information included in the pixel signal output by the plurality of pixels of the first pixel group; and
the signal processing unit is configured to perform weighted addition for a second pixel signal output from the second pixel group by inter-frame processing, and to change a weight on each frame in the weighted addition based on an inter-frame differential of a first pixel signal.

2. An imaging apparatus according to claim 1, further comprising a discrimination processing unit configured to output a discrimination signal indicating a result of comparing the inter-frame differential of the first pixel signal with a threshold value,
wherein the signal processing unit is further configured to change the weight on each frame based on a signal value of the discrimination signal.

3. An imaging apparatus according to claim 2, wherein the discrimination processing unit is further configured to calculate an average value of signals output from a larger number of first pixels than a number of second pixels to be subjected to the inter-frame processing, and to generate the discrimination signal based on an inter-frame differential of the average value.

4. An imaging apparatus according to claim 2, wherein the signal processing unit is further configured to reduce a weight on another frame of the second signal with respect to a weight on a current frame of the second signal as the inter-frame differential of the first pixel signal becomes larger.

5. An imaging apparatus according to claim 3, wherein the first pixels to be subjected to calculation of the average value comprise first pixels around the second pixel to be subjected to the inter-frame processing.

6. An imaging apparatus according to claim 2, wherein:
the discrimination processing unit is further configured to generate the discrimination signal based on an interframe differential of information of a ratio between a first pixel signal interpolated in a position of a second pixel and the second pixel signal; and
the signal processing unit is further configured to reduce a weight on another frame of the second signal with respect to a weight on a current frame of the second signal as the inter-frame differential of the information of the ratio becomes larger.

7. An imaging apparatus according to claim 2, wherein:
the discrimination processing unit is further configured to output the discrimination signal by calculating a motion vector through use of a plurality of frames of the first pixel signal; and
the signal processing unit is further configured to reduce a weight on another frame of the second signal with respect to a weight on a current frame of the second signal as an absolute value of the motion vector becomes larger.

8. An imaging apparatus according to claim 1, further comprising a signal combining unit configured to combine the first pixel signal and the second pixel signal subjected to the inter-frame processing to generate an image signal obtained by expressing each pixel by respective values of R, G, and B.

9. An imaging apparatus according to claim 1, wherein the inter-frame processing comprises a moving average.

10. An imaging apparatus according to claim 1, wherein the inter-frame processing is conducted by a recursive filter.

11. An imaging apparatus according to claim 1, wherein the inter-frame processing is conducted by a non-recursive filter.

12. An imaging apparatus according to claim 1, wherein the inter-frame processing is conducted by a median filter.

13. An imaging apparatus according to claim 1, wherein the first pixel group is formed of W pixels.

14. An imaging apparatus according to claim 1, wherein the second pixel group is formed of an R pixel, a G pixel, and a B pixel.

15. An imaging apparatus according to claim 1, wherein a number of pixels of the first pixel group is larger than a number of pixels of the second pixel group.

16. An imaging apparatus according to claim 1, wherein a pixel of the second pixel group is surrounded by pixels of the first pixel group.

17. An imaging system, comprising:
an imaging apparatus; and
an output signal processing unit configured to process a signal output from the imaging apparatus,
the imaging apparatus comprising:
an imaging device; and
a signal processing unit, wherein:
the imaging device comprises a first pixel group and a second pixel group each comprising a plurality of pixels each configured to output a pixel signal;
the pixel signal output by the plurality of pixels of the second pixel group includes a smaller amount of resolution information than an amount of resolution information included in the pixel signal output by the plurality of pixels of the first pixel group; and
the signal processing unit is configured to perform weighted addition for a second pixel signal output from the second pixel group by inter-frame processing, and to change a weight on each frame in the weighted addition based on an inter-frame differential of a first pixel signal.

18. An image processing method for processing a pixel signal output from an imaging apparatus,
the imaging apparatus comprising:
an imaging device; and
a signal processing unit,
the imaging device comprising a first pixel group and a second pixel group each comprising a plurality of pixels each configured to output the pixel signal,
the pixel signal output by the plurality of pixels of the second pixel group including a smaller amount of resolution information than an amount of resolution information included in the pixel signal output by the plurality of pixels of the first pixel group,
the image processing method comprising performing weighted addition for a second pixel signal output from the second pixel group by inter-frame processing, and changing a weight on each frame in the weighted addition based on an inter-frame differential of a first pixel signal.

19. An imaging device, comprising:

a first pixel group and a second pixel group each comprising a plurality of pixels each configured to output a pixel signal; and a signal processing unit, wherein:

the pixel signal output by the plurality of pixels of the second pixel group includes a smaller amount of resolution information than an amount of resolution information included in the pixel signal output by the plurality of pixels of the first pixel group; and the signal processing unit is configured to perform weighted addition for a second pixel signal output from the second pixel group by inter-frame processing, and to change a weight on each frame in the weighted addition based on an inter-frame differential of a first pixel signal.

20. An imaging device according to claim 19, wherein:

the first pixel group and the second pixel group are formed on a first semiconductor substrate;

the signal processing unit is formed on a second semiconductor substrate; and the first semiconductor substrate and the second semiconductor substrate are laminated on one another.

* * * * *